(12) United States Patent
Watanabe

(10) Patent No.: US 8,416,431 B2
(45) Date of Patent: Apr. 9, 2013

(54) IMAGE PROCESSING APPARATUS THAT CAN OBTAIN MANAGEMENT INFORMATION FROM DIFFERENT SOURCES

(75) Inventor: Yuichi Watanabe, Tokyo (JP)

(73) Assignee: Oki Data Corporation, Tokyo (JP)

( * ) Notice: Subject to any disclaimer, the term of this patent is extended or adjusted under 35 U.S.C. 154(b) by 915 days.

(21) Appl. No.: 11/480,997

(22) Filed: Jul. 6, 2006

(65) Prior Publication Data
US 2007/0013947 A1 Jan. 18, 2007

(30) Foreign Application Priority Data
Jul. 7, 2005 (JP) .................. 2005-198897

(51) Int. Cl.
*G06F 3/12* (2006.01)
(52) U.S. Cl.
USPC ........... 358/1.15; 358/1.1; 358/400; 358/402; 358/443; 358/448
(58) Field of Classification Search .................. 358/1.1, 358/1.15, 400, 402, 443, 448
See application file for complete search history.

(56) References Cited

U.S. PATENT DOCUMENTS

| | | | | |
|---|---|---|---|---|
| 5,887,216 | A * | 3/1999 | Motoyama | 399/8 |
| 6,782,402 | B1 * | 8/2004 | Hidaka et al. | 1/1 |
| 2002/0089692 | A1 * | 7/2002 | Ferlitsch | 358/1.15 |
| 2002/0144023 | A1 * | 10/2002 | Kawabuchi et al. | 710/5 |
| 2004/0049692 | A1 * | 3/2004 | Okamoto | 713/193 |
| 2005/0111856 | A1 * | 5/2005 | Kawai | 399/8 |

FOREIGN PATENT DOCUMENTS

JP 06-183106 7/1994

OTHER PUBLICATIONS

Kawabata Yoshie, Printer System, Jul. 5, 1994, JP 06183106 A.*

* cited by examiner

*Primary Examiner* — Benny Q Tieu
*Assistant Examiner* — Martin Mushambo
(74) *Attorney, Agent, or Firm* — Rabin & Berdo, P.C.

(57) ABSTRACT

An image processing apparatus capable of receiving a response with respect to an acquisition request of management information of a printing apparatus even if the printing apparatus is working. The image processing apparatus comprises a network connecting section; an interface section; a data transferring section; a management information acquiring section; a management information storing section; and a network controlling section, in the case that the printing apparatus is not working, the management information acquiring section acquires management information from the printing apparatus; in the case that the printing apparatus is working, the management information acquiring section acquires management information from the management information storing section.

19 Claims, 21 Drawing Sheets

IMAGE PROCESSING APPARATUS THAT CAN OBTAIN MANAGEMENT INFORMATION FROM DIFFERENT SOURCES

BACKGROUND OF THE INVENTION

1. Field of the Invention

The invention relates to An image processing apparatus to control work situation of a connected printing apparatus.

2. Related Background Art

An image processing apparatus is proposed, which is connected with a network and further is connected with a printing apparatus. The image processing apparatus may has many image process functions such as network scan function, network print function, copy function and the like. Such image processing apparatus may refer to, for example, patent document 1: Japanese patent publication H06-183106.

Such image processing apparatus receives an acquisition request to request management information of the image processing apparatus or the connected printing apparatus from a terminal device. If the acquisition request is to request management information of self (i.e. the image processing apparatus), the image processing apparatus transmits its own management information; if the acquisition request is to request management information of the printing apparatus, the image processing apparatus firstly transfers the acquisition request to the corresponding printing apparatus, then receives a response with respect to the management information from the printing apparatus, further transfers the response to the terminal device having the acquisition request. Thus, the terminal device can confirm management information of the image processing apparatus or the printing apparatus.

However, in Conventional such image processing apparatus, when receiving an acquisition request to request management information of the printing apparatus from the terminal device, the printing apparatus is working, it is impossible to obtain a response with respect to the acquisition request from the printing apparatus. Therefore, the terminal device can not acquire the management information of the printing apparatus.

SUMMARY OF THE INVENTION

It is, therefore, an object of the invention to provide a printing system capable of solving the above stated problem. That is, even if the printing apparatus as an image forming apparatus is working, the image processing apparatus can receive a response with respect to the acquisition request of the management information of the printing apparatus.

According to the present invention, there is provided an image processing apparatus, comprising:

a network connecting section to connect with a network;

an interface section to connect with an outside image processing apparatus;

a data transferring section to transfer data to connected the outside image processing apparatus via the interface section;

a management information acquiring section to acquire management information of the outside image processing apparatus;

a management information storing section to store the management information of the outside image processing apparatus, acquired by the management information acquiring section;

a network controlling section which receives an acquisition request of the management information of the outside image processing apparatus from a host apparatus on the network, acquires the management information from either of the management information storing section and the outside image processing apparatus according to a work situation of the outside image processing apparatus, and performs a response to the host apparatus.

Moreover, the image processing apparatus may further comprises a resource managing section to manage the work situation of the outside image processing apparatus. Then the network controlling section acquires a work information of the outside image processing apparatus from the resource managing section, and has a information source setting portion that, when the outside image processing apparatus is in working, sets the management information storing section into a reading source of the management information of the outside image processing apparatus; when the outside image processing apparatus is not in working, sets the outside image processing apparatus into the reading source of the management information.

Moreover, in the image processing apparatus, the management information acquiring section may update the management information in the management information storing section when the outside image processing apparatus ended a predetermined image process.

Moreover, in the image processing apparatus, the end of the image process of the outside image processing apparatus, may be judged on the basis of a stop time of data transfer through the data transferring section.

Moreover, in the image processing apparatus, the end of the image process of the outside image processing apparatus, may be judged on the basis of a predetermined command received from the host apparatus.

Moreover, in the image processing apparatus, the end of the image process of the outside image processing apparatus, may be judged on the basis of a network disconnection signal of the host apparatus.

Moreover, in the image processing apparatus, the outside image processing apparatus may be an image forming apparatus, then, the management information of the image forming apparatus is returned to the host apparatus.

Moreover, in the image processing apparatus, the outside image processing apparatus may be an image reading apparatus, then, the management information of the image reading apparatus is returned to the host apparatus.

Moreover, in the image processing apparatus, the data transferring section transfers print data received from the host apparatus to the image forming apparatus, then the end of the image process of the outside image processing apparatus, may be judged on the basis of a stop time of the print data transfer through the data transferring section.

Moreover, in the image processing apparatus, the data transferring section transfers print data received from the host apparatus to the image forming apparatus, then the end of the image process of the outside image processing apparatus, may be judged on the basis of a predetermined command received from the host apparatus.

Moreover, in the image processing apparatus, the data transferring section transfers print data received from the host apparatus to the image forming apparatus, then the end of the image process of the outside image processing apparatus, may be judged on the basis of a network break signal of the host apparatus.

Moreover, the image processing apparatus may further comprise an image reading section to read a manuscript, then the data transferring section may transfer image data read by the image reading section to the image forming apparatus.

Moreover, in the image processing apparatus the acquisition of the management information of the outside image processing apparatus through the host apparatus may be executed by using SNMP protocol.

Moreover, in the image processing, the network controlling section may have a command changing portion to change a management information acquisition request through the SNMP protocol into control command capable of being interpreted by the outside image processing apparatus The above and other objects and features of the present invention will become apparent from the following detailed description and the appended claims with reference to the accompanying drawings.

DETAILED DESCRIPTION OF THE PREFERRED EMBODIMENTS

Embodiments of the invention will be described in detail hereinbelow with reference to the drawings.

Moreover, the present invention can be realized through starting whole compositions including new part or changed part by CPU in inside of apparatus and through adding or changing control program.

<Embodiment 1>

Figure 1:
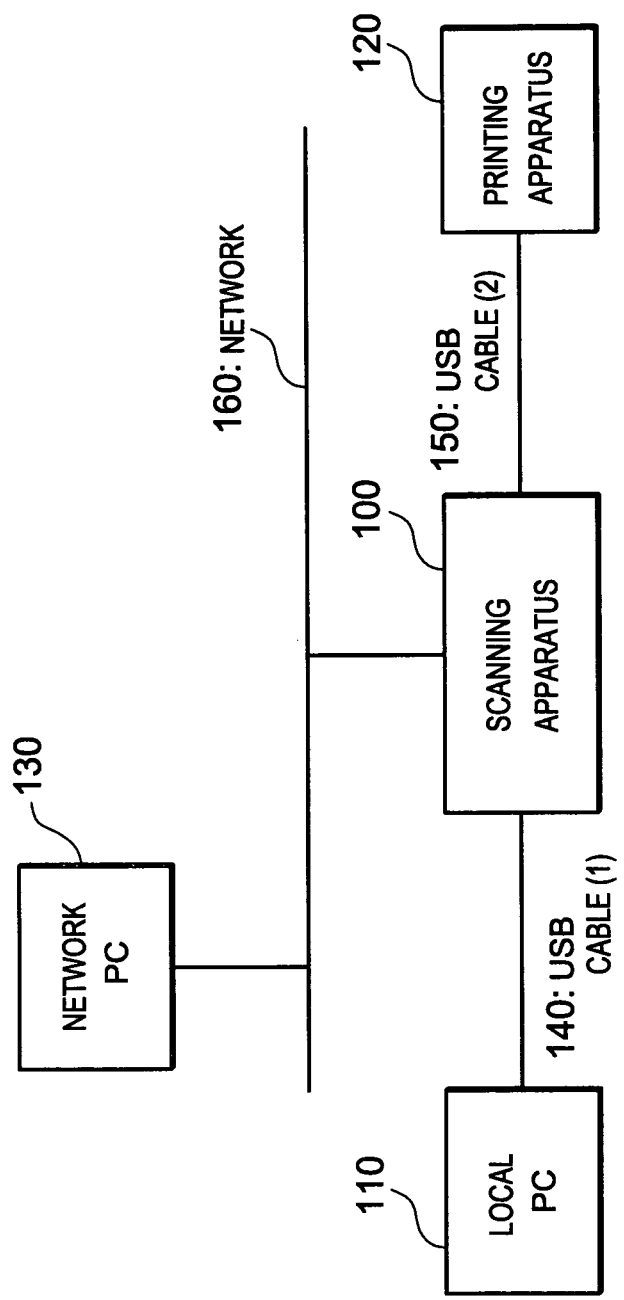
FIG. 1 is a block diagram showing whole structure of an image system in embodiment 1.

FIG. 1 is a block diagram showing whole structure of an image system in embodiment 1.

As shown by FIG. 1, an image processing system comprises a scanning apparatus 100 (i.e. scanner), a local PC 110, a printing apparatus 120 (i.e. printer), a network PC 130, a USB cable (1) 140, a USB cable (2) 150 and a network 160.

The scanning apparatus 100 is an image processing apparatus which reads image information from a manuscript image, changes the image information into image data and outputs the image data. The scanning apparatus 100 is connected with the network 160. Further, on the scanning apparatus 100, the local PC 110 is connected via the USB cable (1) 140, and the printing apparatus 120 is connected via the USB cable (2) 150.

The local PC 110 is connected with the scanning apparatus 100 via the USB cable (1) 140 and is a host apparatus such as a personal computer (PC) executing reception and transmission of image data with the scanning apparatus 100.

The printing apparatus 120 is connected with the scanning apparatus 100 via the USB cable (2) 150 and is an image forming apparatus to receive image data and the like and perform a print output.

The network PC 130 is connected with the scanning apparatus 100 via the network 160 and is a host apparatus such as a personal computer (PC) executing reception and transmission of image data with scanning apparatus 100.

The USB cable (1) 140 is a connecting means to communicatively connect the local PC 110 as a host to the scanning apparatus 100 as a device on the basis of USB protocol.

The USB cable (1) 150 is a connecting means to communicatively connect the scanning apparatus 100 as a host to the printing apparatus 120 as a device on the basis of USB protocol.

The network 160 is a communication network is laid in a relative narrow range such as LAN (Local Area Network) and the like.

Next, regarding main apparatus to construct the image processing system, their respective internal structures will be explained in detail.

Figure 2:
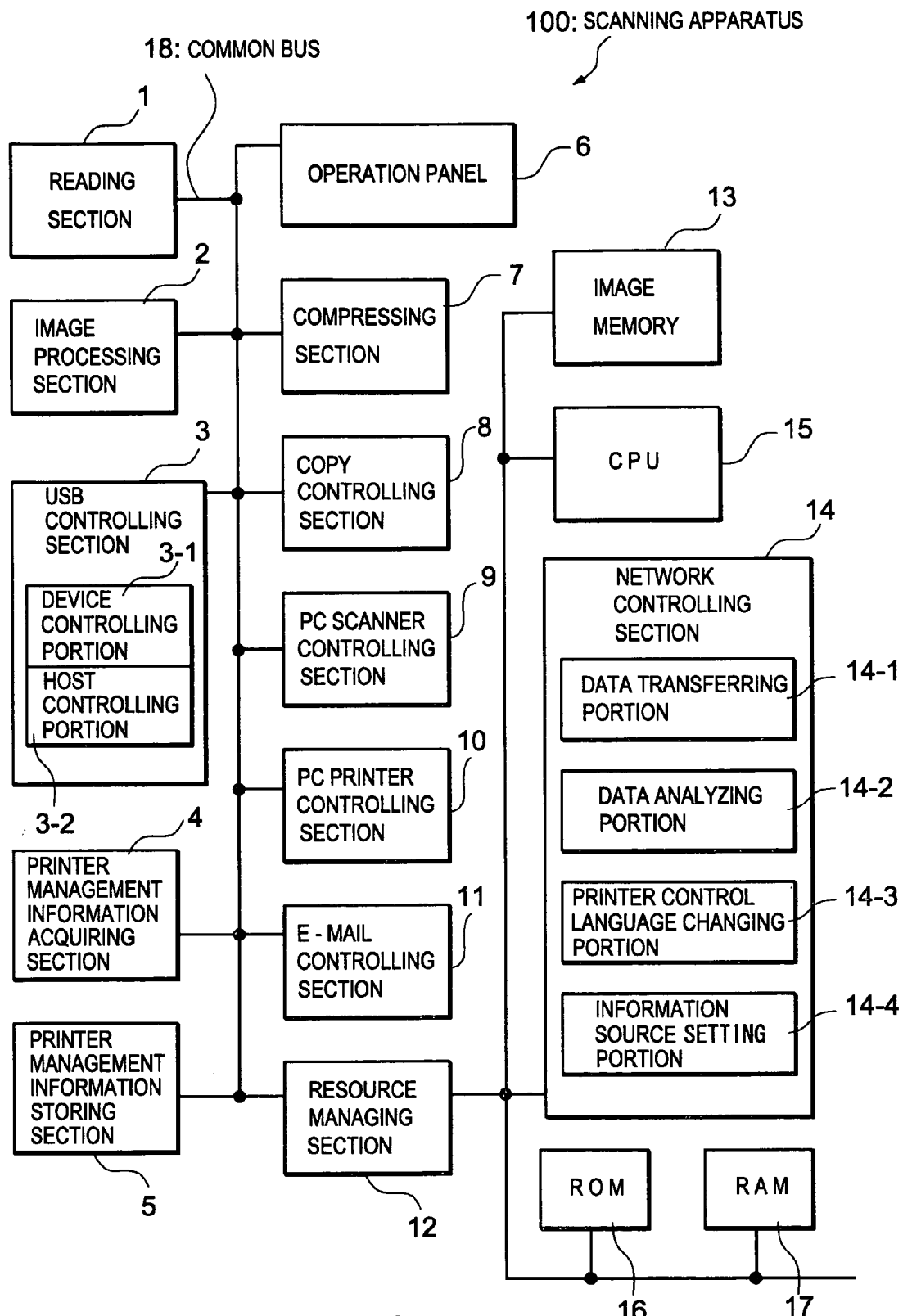
FIG. 2 is a block diagram showing internal structure of a scanning apparatus in embodiment 1.

FIG. 2 is a block diagram showing internal structure of a scanning apparatus in embodiment 1.

As shown by FIG. 2, the scanning apparatus 100 includes a reading section 1, an image processing section 2, a USB controlling section 3, a printer management information acquiring section 4, a printer management information storing section 5, an operation panel 6, a compressing section 7, a copy controlling section 8, a PC scanner controlling section 9, a PC printer controlling section 10, an E-mail controlling section 11, a resource managing section 12, an image memory 13, a network controlling section 14, a CPU 15, a ROM 16, a RAM 17 and a common bus 18.

The reading section 1 is a part to read manuscript image. The image processing section 2 is a part to change image information read by the reading section 1 into image data. The USB controlling section 3 has a device controlling portion 3-1 and accepts a control from the local PC 110 (FIG. 1) via the USB cable (1) 140 by the device controlling portion 3-1. Further, the USB controlling section 3 has a host controlling portion 3-2 and controls the printing apparatus 120 (FIG. 1) via the USB cable (2) 150 by the host controlling portion 3-2. That is, the device controlling portion 3-1 is a means to make the scanning apparatus 100 function as a device of the local PC 110; the host controlling portion 3-2 a means to make the scanning apparatus 100 function as a host of the printing apparatus 120. the The printer management information acquiring section 4 is a part to acquire printer management information from the printing apparatus 120 (FIG. 1) via the USB cable (2) 150. Here, the printer management information will be explained.

Figure 3:
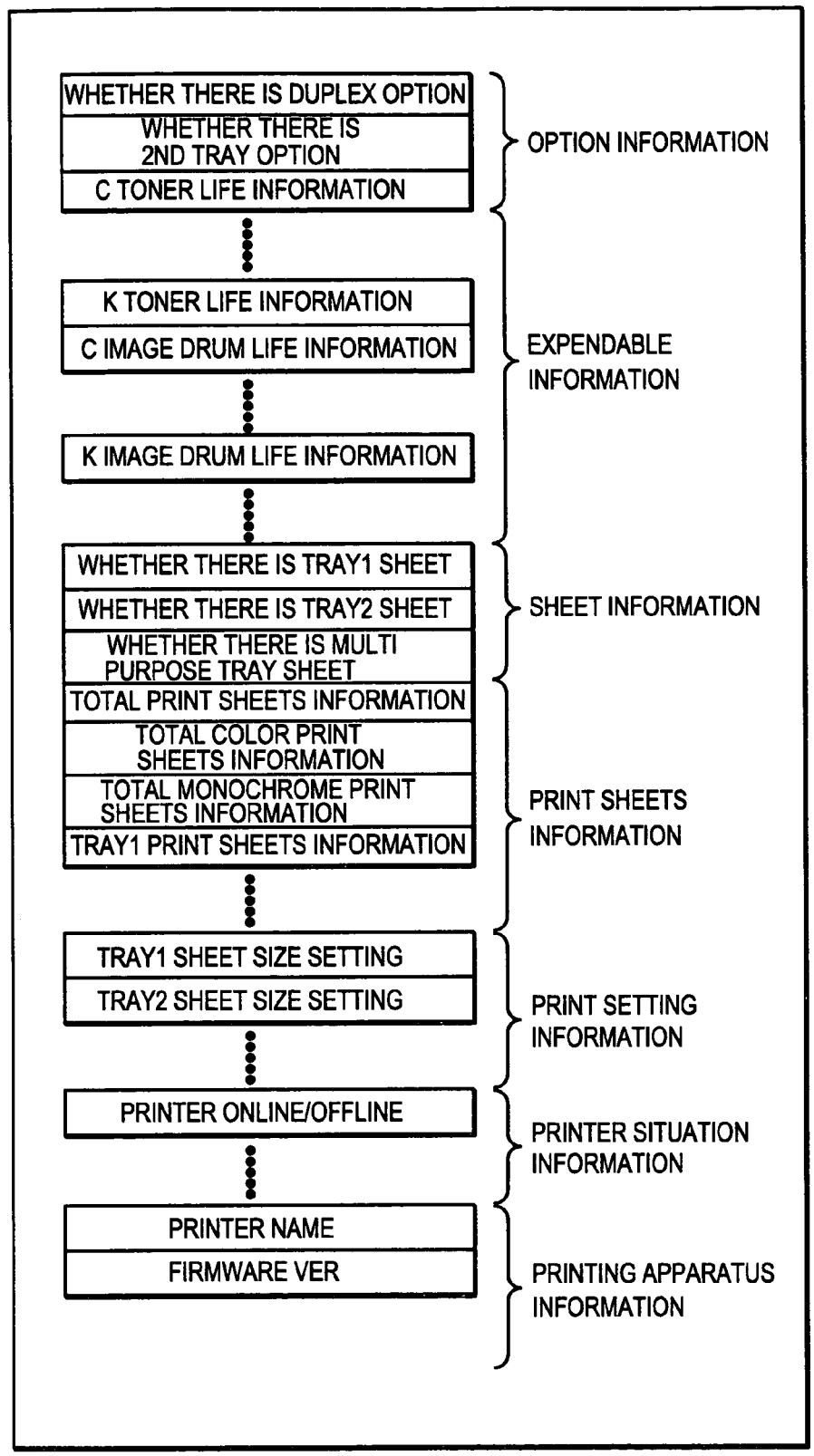
FIG. 3 is an explanation diagram of printer management information.

FIG. 3 is an explanation diagram of printer management information.

As shown by FIG. 3, the printer management information contains option information, expendable information, paper information, print sheet number information, printer setting information, printer state (information), printing apparatus information and the like, they are formed from information displaying current quantity of expendable, work record or the like of the printing apparatus 120. The printer management information is acquired by the printer management information acquiring section 4 whenever the printing apparatus 120 ends print job in general. The printer management information storing section 5 is a memory to store the acquired printer management information. The printer management information is updated by the printer management information acquiring section 4 whenever print job is end.

Returning FIG. 2 to explain again, the operation panel 6 is a part to make user perform operation and setting of the scanning apparatus 100. The compressing section 7 is a part to compress image data processed by the image processing section 2. The copy controlling 25 section 8 is a part to realize a copy function through combining the scanning apparatus 100 with the printing apparatus 120. The PC scanner controlling section 9 is a part to make the scanning apparatus 100 function as a PC scanner. The PC printer controlling section 10 is a part, once received the data packet from PC, to transfer data packet to the printing apparatus 120. The E-mail controlling section 11 is a part to control reception and transmission of E-mail to network PC 130.

The resource managing section 12 is a part to manage and adjust work situation of the scanning apparatus 100 as that plural functions such as network scanner function, network printer function, copy function and the like do not simultaneously work in the scanning apparatus 100. The image memory 13 a memory to temporarily memorize image data used when the reading section 1, the image processing section 2 and the compressing section 7 perform respective processes. Serving as the memory, in general, it may be a part of memorizing area of the RAM 17.

The network controlling section 14 has a data transferring portion 14-1, a data analyzing portion 14-2, a printer control language changing portion 14-3 and an information source setting portion 14-4 and is a part to make the scanning apparatus 100 (FIG. 1) connect to the network 160 (FIG. 1).

The data transferring portion 14-1 is a means to execute reception and transmission of data packet between the network 160 (FIG. 1) and the scanning apparatus 100 (FIG. 1).

The data analyzing portion 14-2 is a means to analyze data packet received by the data transferring portion 14-1.

The printer control language changing portion 14-3 is a means to change the data packet received by the data transferring portion 14-1 into PJL (Printer Job control Language) which is a language capable of being understood by the printing apparatus 120 without network function, in the case that the data packet is a printer management protocol signal according to SNMP network protocol.

The information source setting portion 14-4 is a setting means which, in the case that an acquisition request of management information of the printing apparatus 120 is transmitted from the network PC 130 (FIG. 1), on the basis of information of the resource managing section 12, if the printing apparatus 120 (FIG. 1) is judged to be in non-work situation (un-printing situation), transfers an acquisition request of management information and returns management information based on a response with respect to the printing apparatus 120 (FIG. 1); and if the printing apparatus 120 (FIG. 1) is judged to be in work situation (printing situation), reads management information from the printer management information storing section 5 and returns the management information.

The CPU 15 is a micro-processor to execute a control program previously stored in the ROM 16 so as to start or control the all compositions stated above. The ROM 16 is a read only memory to previously store a control program to be executed by the CPU 15 for starting or controlling the all compositions stated above. The RAM 17 is a random access memory to provide calculation area used in processing course of the CPU 15. The common bus 18 is a signal path to communicatively connect respective compositions.

Figure 4:
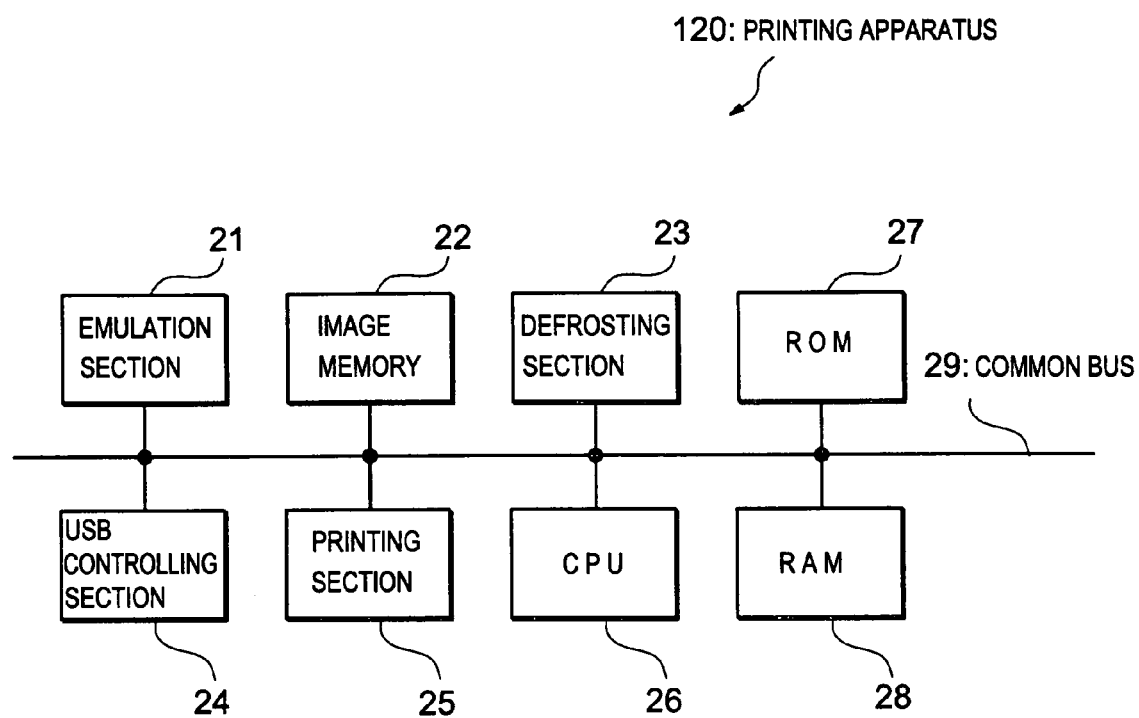
FIG. 4 is a block diagram showing internal structure of a printing apparatus in embodiment 1.

FIG. 4 is a block diagram showing internal structure of a printing apparatus in embodiment 1.

As shown by FIG. 4, the printing apparatus 120 in embodiment 1 includes an emulation section 21, an image memory 22, a defrosting section 23, a USB controlling section 24, a printing section 25, a CPU 26, a ROM 27 and a RAM 28.

The emulation section 21 is a part to handle printer description language (PDL) and PJL language. The image memory 22 is a memory to temporarily memorize image data in processing, and generally is a part of memory area through assigning the RAM 28. The defrosting section 23 is a part to defrost data packet compressed and transmitted so as to elongate the data packet. The USB controlling section 24 is a part to receive a control of the USB cable (2) 150. The printing section 25 is a print engine to print received image data.

The CPU 26 is a micro-processor to execute a control program previously stored in the ROM 27 so as to start or control the all compositions stated above. The ROM 27 is a read only memory to previously store a control program to be executed by the CPU 26 for starting or controlling the all compositions stated above. The RAM 28 is a random access memory to provide calculation area used in processing course of the CPU 26.

Next is to explain a summary of USB control used in the image processing system of the present invention in the embodiment.

Figure 5:
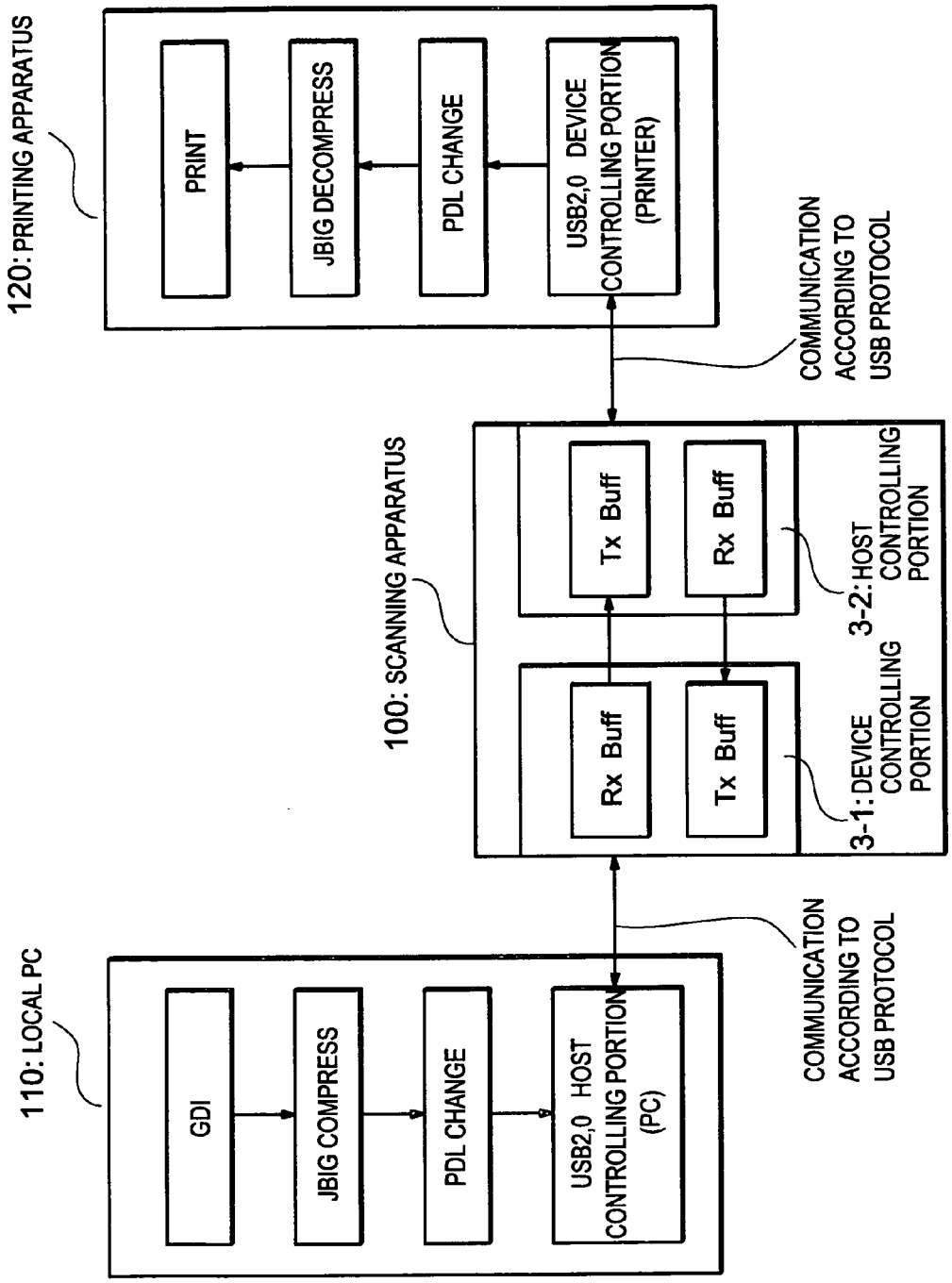
FIG. 5 is a system structure diagram on the basis of a USB control.

FIG. 5 is a system structure diagram on the basis of a USB control.

As shown by FIG. 5, in the image processing system of the embodiment, a communication following USB protocol is performed between the local PC 110 and the scanning apparatus 100, and between the scanning apparatus 100 and the printing apparatus 120.

That is, in inside of the local PC 110, data is processed by GDI (Graphic Device Interface) process, JBIG (Joint Bi-level Image experts Group) compression process and PDL (Page Description Language) change process; and is sent to a USB Host portion. Here, change data is constructed from data packet, and is transmitted to the device controlling portion 3-1 of the scanning apparatus 100 according to USB protocol. The host controlling portion 3-2 of the scanning apparatus 100 transmits data packet to a USB device portion of the printing apparatus 120 according to USB protocol. In the printing apparatus 120, data packet is processed by analyzing process, PDL change process and JBIG elongation process, and is used in print output.

The following is to explain summary of USB control and establishment of configuration.

Figure 6:
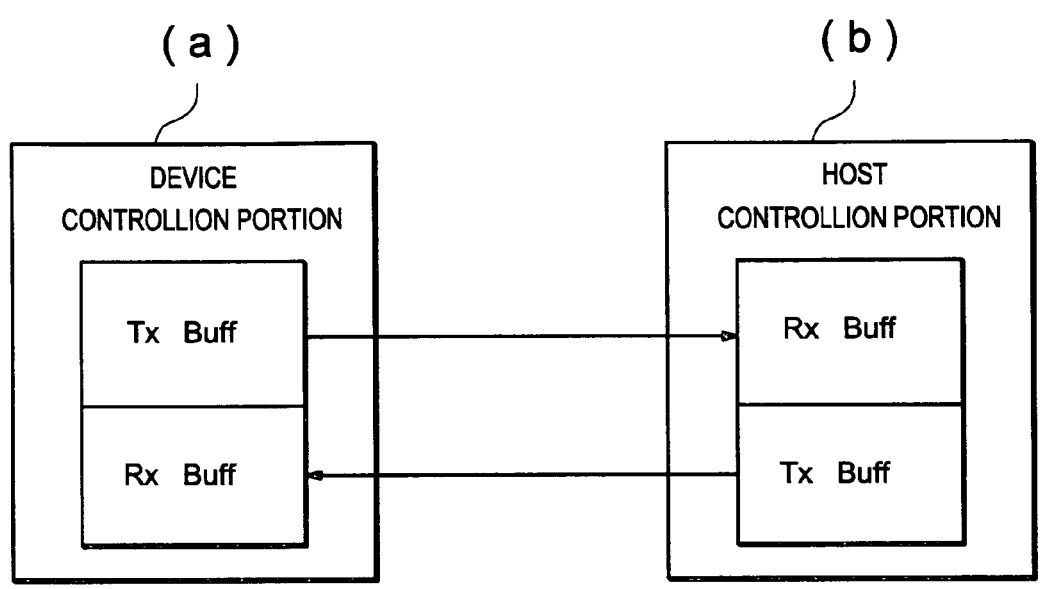
FIG. 6 is an explanation a USB control.

FIG. 6 is an explanation a USB control.

A device control means (a) is controlled by a host controlling means (b). Therefore, in the communication between the local PC 110 (FIG. 1) and the scanning apparatus 100 (FIG. 1), the host controlling means (b) is provided to the local PC 110 (FIG. 1) and the device controlling means (a) is provided to the scanning apparatus 100 (FIG. 1). In the communication between the scanning apparatus 100 (FIG. 1) and the printing apparatus 120 (FIG. 1), the host controlling means (b) is provided to the scanning apparatus 100 (FIG. 1) and the device controlling means (a) is provided to the printing apparatus 120 (FIG. 1).

As shown by FIG. 6, on the one hand, the device controlling means (a) has a RxBuff (buffer) for receiving data packet from the host controlling means (b) and a TxBuff (buffer) for transmitting data packet to the host controlling means (b). On the other hand, the host controlling means (b) has a RxBuff (buffer) for receiving data packet from the device controlling means (a) and a TxBuff (buffer) for transmitting data packet to the device controlling means (a).

In the case that the host controlling means (b) is provided to the local PC 110 (FIG. 1) and the device controlling means (a) is provided to the scanning apparatus 100 (FIG. 1), an establishment of configuration (between the local PC 110 and the scanning apparatus 100) is performed as follows.

When the scanning apparatus 100 (FIG. 1) is connected to the local PC 110 (FIG. 1) via the USB cable (1) 140 (FIG. 1), the scanning apparatus 100 (FIG. 1) is in an attaching state. The attaching state is a state in which the signal line D+ or D− of the USB cable (1) 140 (FIG. 1) is 3.3V (volt). The local PC 110 (FIG. 1) detects the attaching state of the scanning apparatus 100 (FIG. 1), then after 110 mSec passed, requests the scanning apparatus 100 (FIG. 1) to reset. The resetting request is to make the signal line D+ or D− become low level (0V).

The scanning apparatus 100 (FIG. 1), when detected the resetting request, resets respective sections and becomes default state. In the default state, a control transfer using pipe 0 becomes possible.

In the control transfer used in default state, a communication route is established according to an order of setup stage, data stage and status stage as follows.

In the setup stage, initially, token packet and data packet for setup are transmitted from the local PC 110 (FIG. 1), then handshake packet is returned from the scanning apparatus 100 (FIG. 1).

In the data stage, when writing, OUT token packet is transmitted from the local PC 110 (FIG. 1) to the scanning apparatus 100 (FIG. 1), the data transfer direction is decided being from the local PC 110 (FIG. 1) to the scanning apparatus 100 (FIG. 1). Later, data packet is transmitted from the local PC 110 (FIG. 1) to the scanning apparatus 100 (FIG. 1). After transfer of the data packet, handshake packet is transmitted from the scanning apparatus 100 (FIG. 1) to the local PC 110 (FIG. 1).

Further, when reading, IN token packet is transmitted from the local PC 110 (FIG. 1) to the scanning apparatus 100 (FIG. 1), if the scanning apparatus 100 (FIG. 1) can perform data transmission, the scanning apparatus 100 transmits data packet; but if the scanning apparatus 100 (FIG. 1) can not perform data transmission, the scanning apparatus 100 transmits handshake packet. In the case that the data packet is transmitted from the scanning apparatus 100 (FIG. 1), if the local PC 110 1108 can correctly receive, ACK packet of the handshake packet is transmitted from the local PC 110 (FIG. 1) to the scanning apparatus 100 (FIG. 1).

In the status stage, data packet exchange contrary to that in the data stage is executed, and transfer confirmation in the data stage is performed.

Further, the device controlling portion 3-1 (FIG. 2) of the scanning apparatus 100 has an area (called: device descriptor) describing attributes of its own, through the local PC 110 (FIG. 1) reads out its content, the local PC 110 can identify the kind of the scanning apparatus 100 (FIG. 1), then executes an appropriate control. The scanning apparatus 100 uses the device descriptor to report its own attributes to the local PC 110 (FIG. 1), whenever the local PC 110 (FIG. 1) requests device descriptor information, the scanning apparatus 100 returns its own information. Then, address is assigned by the local PC 110 (FIG. 1), and when the device structure of the scanning apparatus 100 (FIG. 1) is identified, the local PC 110 (FIG. 1) and the scanning apparatus 100 (FIG. 1) are communicatively connected according to USB protocol.

Further, in the case that the host controlling means (b) is provided to the scanning apparatus 100 (FIG. 1) and the device controlling means (a) is provided to the printing apparatus 120 (FIG. 1), as stated above, according to the same order, a configuration is established (between the scanning apparatus 100 and the printing apparatus 120), through the scanning apparatus 100 (FIG. 1), with respect to the printing apparatus 120 (FIG. 1), address is assigned, and when the device structure of the printing apparatus 120 (FIG. 1) is identified, the scanning apparatus 100 (FIG. 1) and the printing apparatus 120 (FIG. 1) are communicatively connected according to USB protocol.

Next, regarding PC print function, PC scan function and copy function that use above-stated USB control, their data flow will be explained.

Figure 7:
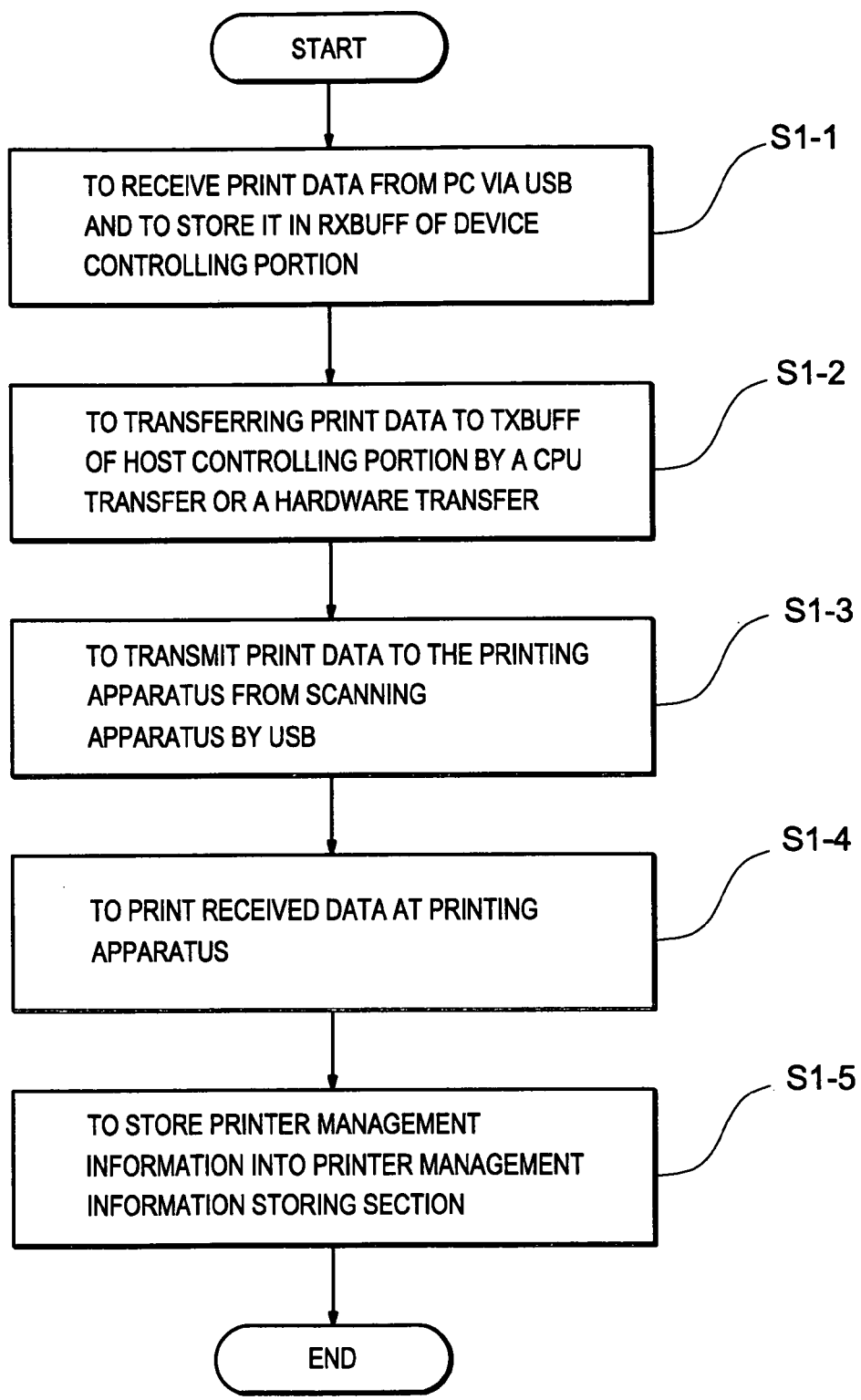
FIG. 7 is a flowchart showing operations while PC print.

FIG. 7 is a flowchart showing operations while PC print.

Step S1-1

The scanning apparatus 100 (FIG. 1) receives data packet of print data from the local PC 110 (FIG. 1) via the USB cable (1) 140 (FIG. 1). The data packet (print data) is temporarily stored in the RxBuff of the device controlling portion 3-1 (FIG. 5).

Step S1-2

The USB controlling section 3 (FIG. 2) performs a Cpu transfer or a hardware transfer to transfer the data packet of print data from the RxBuff of the device controlling portion 3-1 (FIG. 5) to the TxBuff of the host controlling portion 3-2 (FIG. 5).

Step S1-3

The USB controlling section 3 (FIG. 2) transmits the data packet of the print data to the printing apparatus 120 (FIG. 1) from the host controlling portion 3-2 (FIG. 5).

Step S1-4

The printing apparatus 120 (FIG. 1) analyzes the data packet of the print data, obtains the print data and performs a general print process.

Step S1-5

The scanning apparatus 100 (FIG. 2), after the print process ended, with respect to the printing apparatus 120 (FIG. 1), issues a management information acquisition command of printer language. Here, a judgment of print process end is executed by the scanning apparatus 100 (FIG. 2). When the print data stopped within a predetermined time, the print process can be judged it ended (non-work). The printing apparatus 120 (FIG. 1) having received the management information acquisition command transmits printer management information to the scanning apparatus 100 (FIG. 2). The scanning apparatus 100 (FIG. 2) stores the acquired printer management information into the printer management information storing section 5 (FIG. 2), then ends the flow.

Figure 8:
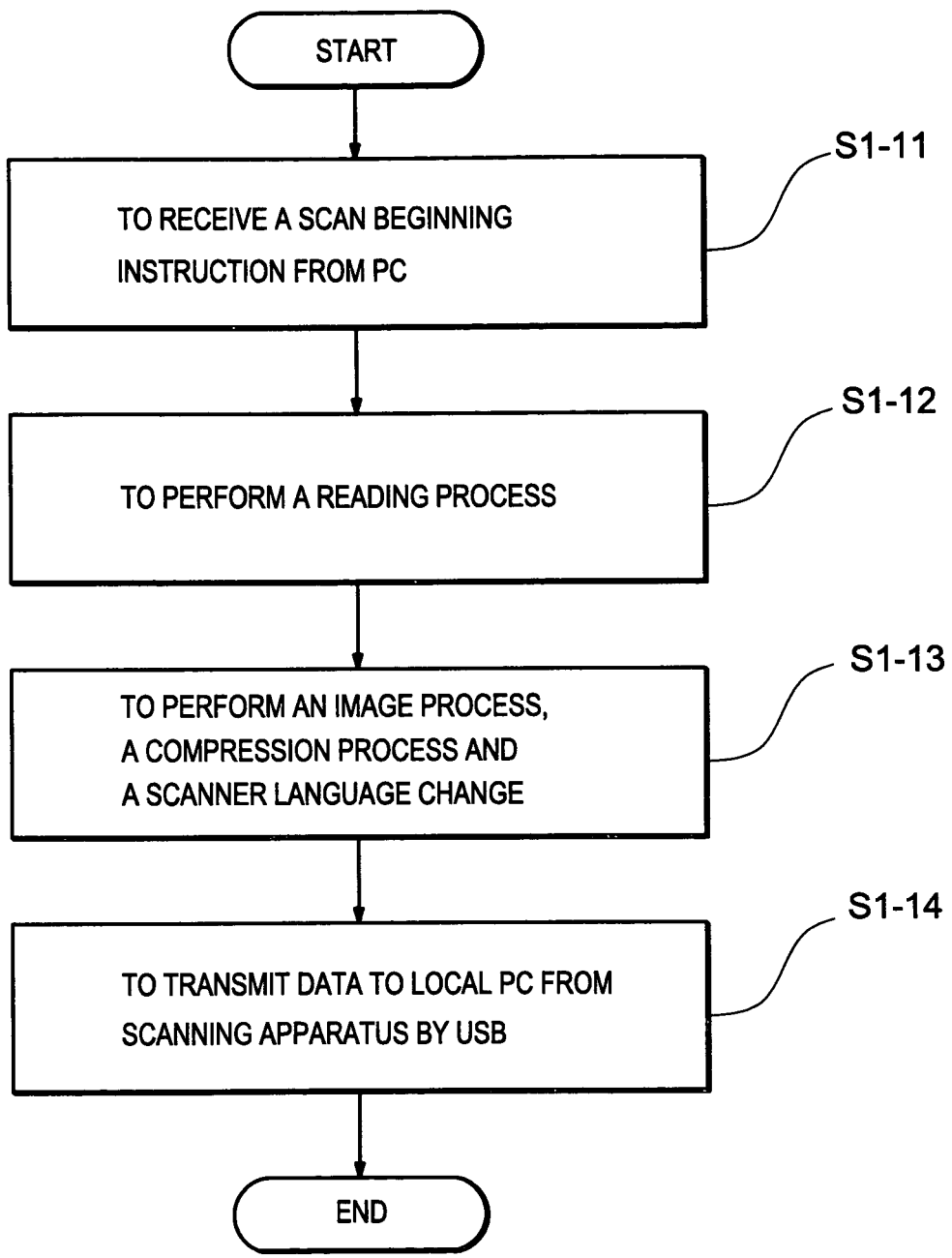
FIG. 8 is a flowchart showing operations while PC scan.

FIG. 8 is a flowchart showing operations while PC scan.

Step S1-11

The local PC 110 (FIG. 1) transmits a start command of PC scan use in order to request an execution of PC scan. The device controlling portion 3-1 (FIG. 2) receives the start command (to receive a scan beginning instruction).

Step S1-12

The device controlling portion 3-1 (FIG. 2), after received the start command of PC scan use, performs a command analyzation, if judged that the command is the start command of PC scan use, transmits the start command to the PC scanner controlling section 9 (FIG. 2). The PC scanner controlling section 9 starts the reading section 1 (FIG. 2) to read a manuscript image.

Step S1-13

The image processing section 2 (FIG. 2) and the compressing section 7 (FIG. 2) perform an image process, a compression process and a scanner language change with respect to read data. Here, the scanner language has a formation combining the read data into communication use command capable of being interpreted by host apparatus.

Step S1-14

The host controlling portion 3-2 (FIG. 2) constructs data packet from the read data performed the image process, the compression process and the scanner language change, and transmits the data packet to the local PC 110 (FIG. 1) from the device controlling portion 3-1 (FIG. 2) via the USB cable (1) 140 (FIG. 1), then ends the flow.

Figure 9:
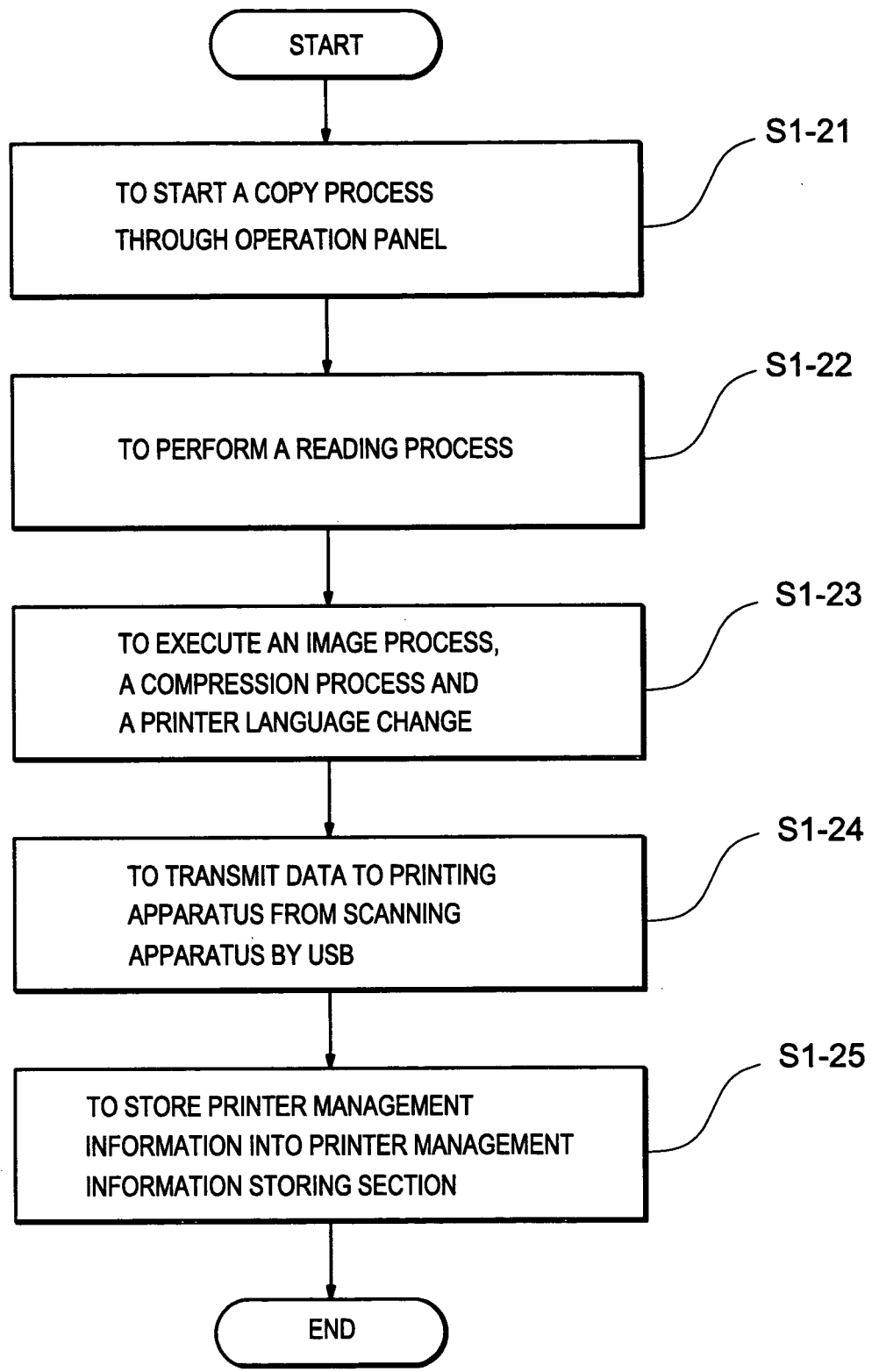
FIG. 9 is a flowchart showing operations while copy.

FIG. 9 is a flowchart showing operations while copy.

Step S1-21

A copy process is started by user through the operation panel 6 (FIG. 2).

Step S1-22

The copy controlling section 8 (FIG. 2) starts the reading section 1 (FIG. 2) to read a manuscript image.

Step S1-23

An image process, a compression process and a printer language change are executed on the basis of designation of user through the operation panel 6 (FIG. 2).

Step S1-24

The copy controlling section 8 (FIG. 2) transmits print data performed the image process, the compression process and the printer language change to the host controlling portion 3-2 (FIG. 2). The host controlling portion 3-2 (FIG. 2) constructs data packet, and transmits the data packet to the printing apparatus 120 (FIG. 1). The printing apparatus 120 (FIG. 1) receives the data packet and obtains print data, then executes a copy (print process).

Step S1-25

The scanning apparatus 100 (FIG. 2), after the print process ended, with respect to the printing apparatus 120 (FIG. 1), issues a management information acquisition command of printer language. Here, a judgment of print process end is executed by the scanning apparatus 100 (FIG. 2). When the print data stopped within a predetermined time, the print process can be judged it ended (non-work). The printing apparatus 120 (FIG. 1) having received the management information acquisition command transmits printer management information to the scanning apparatus 100 (FIG. 2). The scanning apparatus 100 (FIG. 2) stores the acquired printer management information into the printer management information storing section 5 (FIG. 2), then ends the flow.

The following is to explain a summary of data control while network print used in the image processing system of the embodiment.

Figure 10:
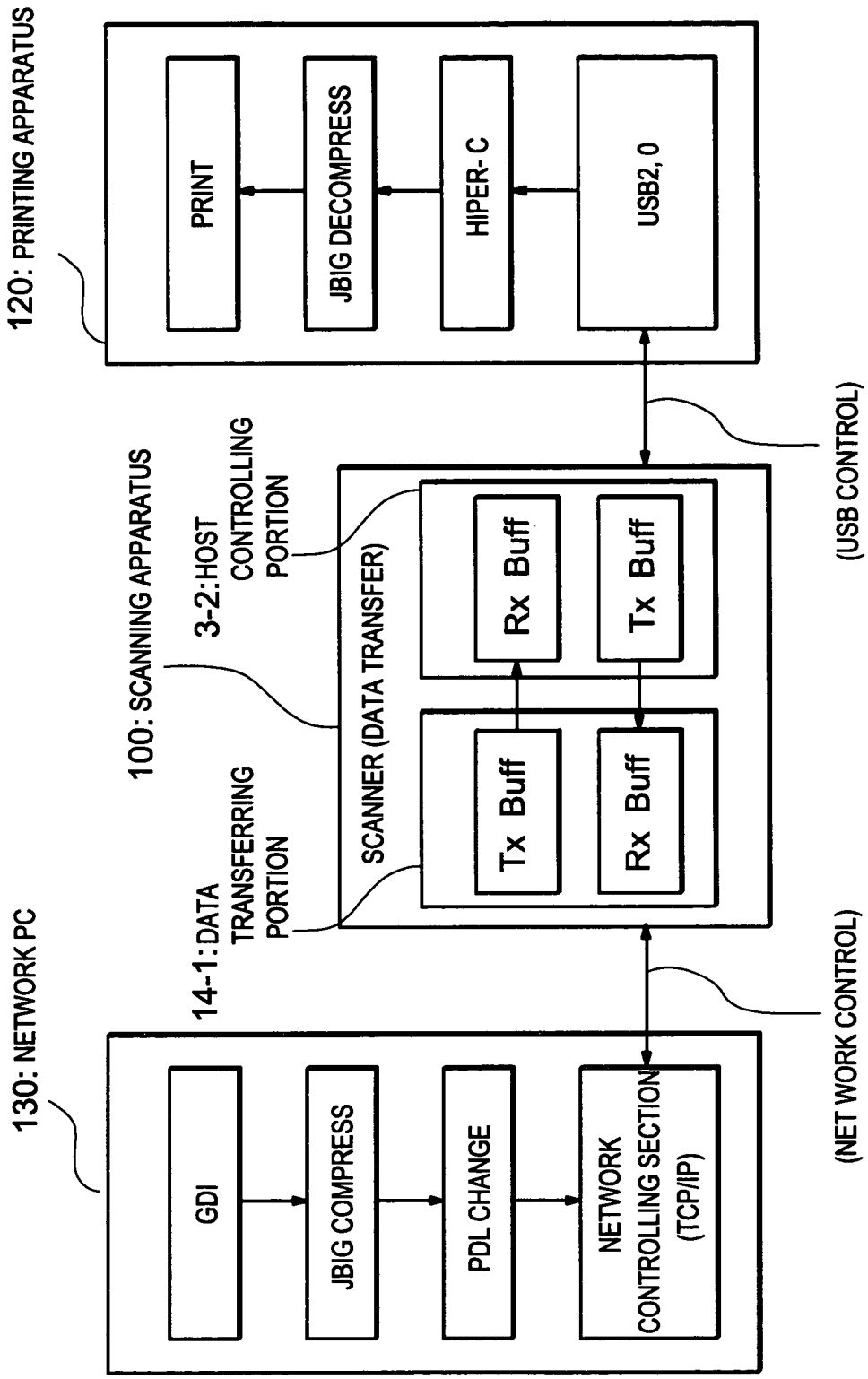
FIG. 10 is a system structure diagram on the basis of a network control.

FIG. 10 is a system structure diagram on the basis of a network control.

As shown by FIG. 10, in between the network PC 130 and the scanning apparatus 100, a communication following TCP/IP protocol is executed, and in between the scanning apparatus 100 and the printing apparatus 120, a communication following USB protocol is executed.

That is, in the inside the network PC 130, print data is processed by a GDI process, a JBIG compression process and a PDL change process; then is sent to a network controlling section of the network PC 130; and is used to construct data packet on the basis of TCP/IP protocol; further is transmitted to the data transferring portion 14-1 of the scanning apparatus 100 via network. Later, the data packet is transmitted from the host controlling portion 3-2 of the scanning apparatus 100 to USB device controlling means of the printing apparatus 120 according to USB protocol. Further, in the inside of the printing apparatus 120, the data packet is analyzed, is PDL-expansion-processed and is JBIG-elongation-processed; then is printed and outputted.

Moreover, the data packet transfered by the printing apparatus 120 (FIG. 1) is temporarily stored in RxBuff of the host controlling portion 3-2 through the above-stated USB control. The data packet is sent to TxBuff through Cpu transfer or hardware transfer and is stored in the TxBuff; later, is transmitted to the data transferring portion 14-1; further, is transmitted to the network PC 130 (FIG. 1) via the network 160 (FIG. 1).

Next is to explain a flow of data in network print function using network control stated above.

Figure 11:
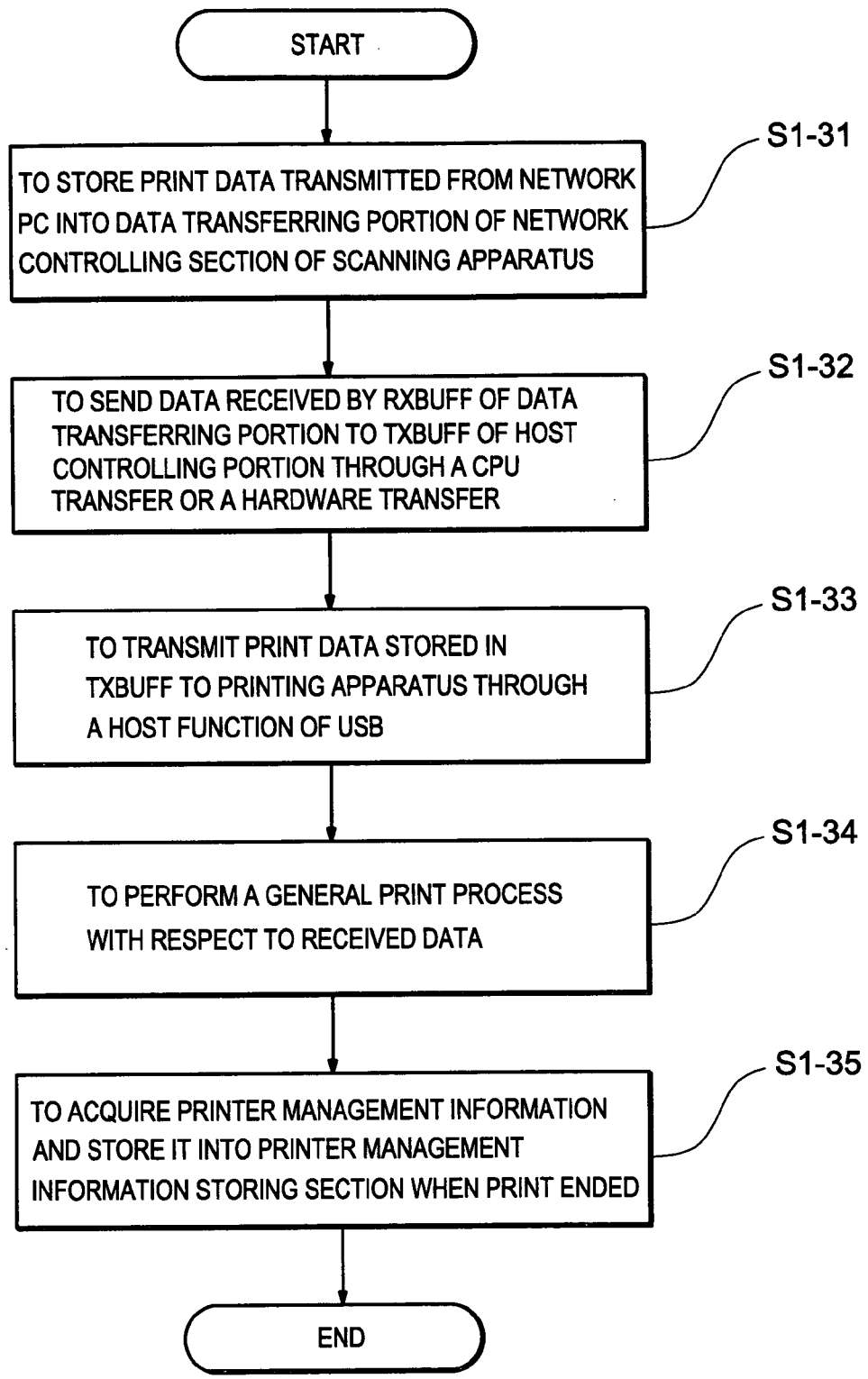
FIG. 11 is a flowchart showing operations of network print process.

FIG. 11 is a flowchart showing operations of network print process.

Step S1-31

The scanning apparatus 100 (FIG. 1) receives data packet of print data from the network PC 130 (FIG. 1) via the network 160 (FIG. 1). The data packet (print data) is temporarily stored in the RxBuff of the data transferring portion 14-1 (FIG. 10).

Step S1-32

The data packet (print data) stored in the RxBuff of the data transferring portion 14-1 (FIG. 10) is sent to TxBuff of the host controlling portion 3-2 (FIG. 10) through a Cpu transfer or a hardware transfer.

Step S1-33

The host controlling portion 3-2 (FIG. 10) transmits the data packet (print data) stored in the TxBuff to the printing apparatus 120 (FIG. 10).

Step S1-34

The printing apparatus 120 (FIG. 10) analyzes the data packet of the print data, obtains the print data and performs a print process.

Step S1-35

The scanning apparatus 100 (FIG. 10), after the print process ended, with respect to the printing apparatus 120 (FIG. 10), issues a management information acquisition command of printer language. Here, a judgment of print process end is executed by the scanning apparatus 100 (FIG. 10). When the print data stopped within a predetermined time, the print process can be judged it ended (non-work). The printing apparatus 120 (FIG. 10) having received the management information acquisition command transmits printer management information to the scanning apparatus 100 (FIG. 10). The scanning apparatus 100 (FIG. 10) stores the acquired printer management information into the printer management information storing section 5 (FIG. 2), then ends the flow.

Next is to explain printer management information acquisition control used in the image processing system through the embodiment.

Figure 12:
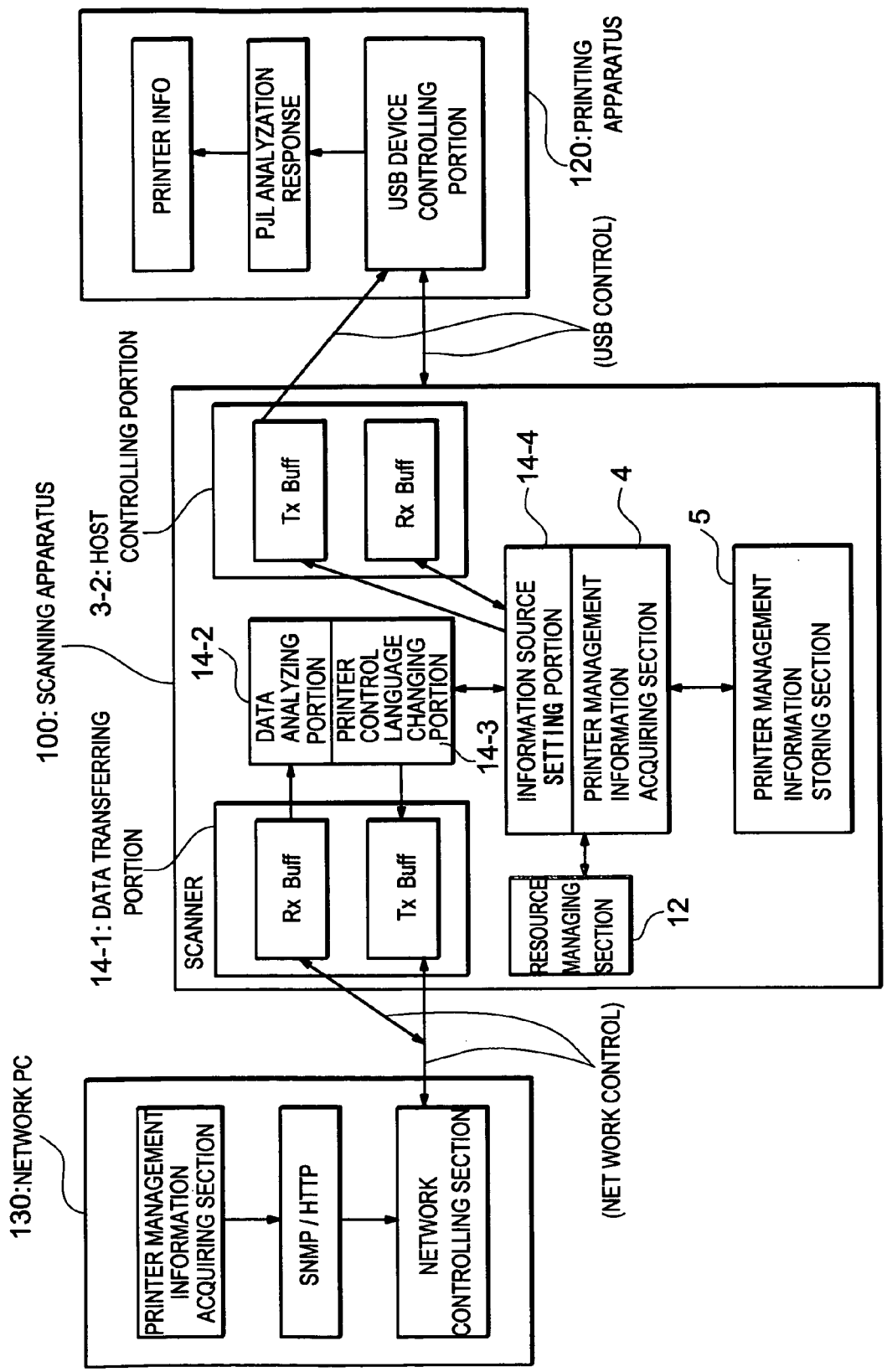
FIG. 12 is a system structure diagram on the basis of a printer management information acquisition control.

FIG. 12 is a system structure diagram on the basis of a printer management information acquisition control.

As shown by FIG. 12, in between the network PC 130 and the scanning apparatus 100, a communication following TCP/IP protocol is executed, and in between the scanning apparatus 100 and the printing apparatus 120, a communication following USB protocol is executed.

In general, in the inside the network PC 130, a printer management information acquisition control tool for managing printing apparatus is installed by using SNMP (Simple Network Management Protocol) and MIB (management Information Base). By using the printer management information acquisition control tool, a printer management information acquisition command is transmitted from the network PC 130 to the scanning apparatus 100. The scanning apparatus 100, after received the command, changes the command into PJL (Printer Job control Language) capable be interpreted by the printing apparatus 120; and transmits the command to the printing apparatus 120 or send the command to the printer management information acquiring section 4 on the basis of control of the information source setting portion 14-4. Here, if the command is sent to the printer management information acquiring section 4, the operation is performed on the basis of USB control.

Moreover, the data packet transfered by the printing apparatus 120 (FIG. 1) is temporarily stored in RxBuff of the host controlling portion 3-2 through the above-stated USB control. The data packet is further stored into TxBuff of the data transferring portion 14-1 through the printer management information acquisition control tool. The data transferring portion 14-1 transmits the data packet to the network PC 130 via the network 160 (FIG. 1). Alike, information acquired from the printer management information acquiring section 4 is also stored into the TxBuff of the data transferring portion 14-1 through the printer management information acquisition control tool. The following is a detail explanation through using flowchart.

Figure 13:
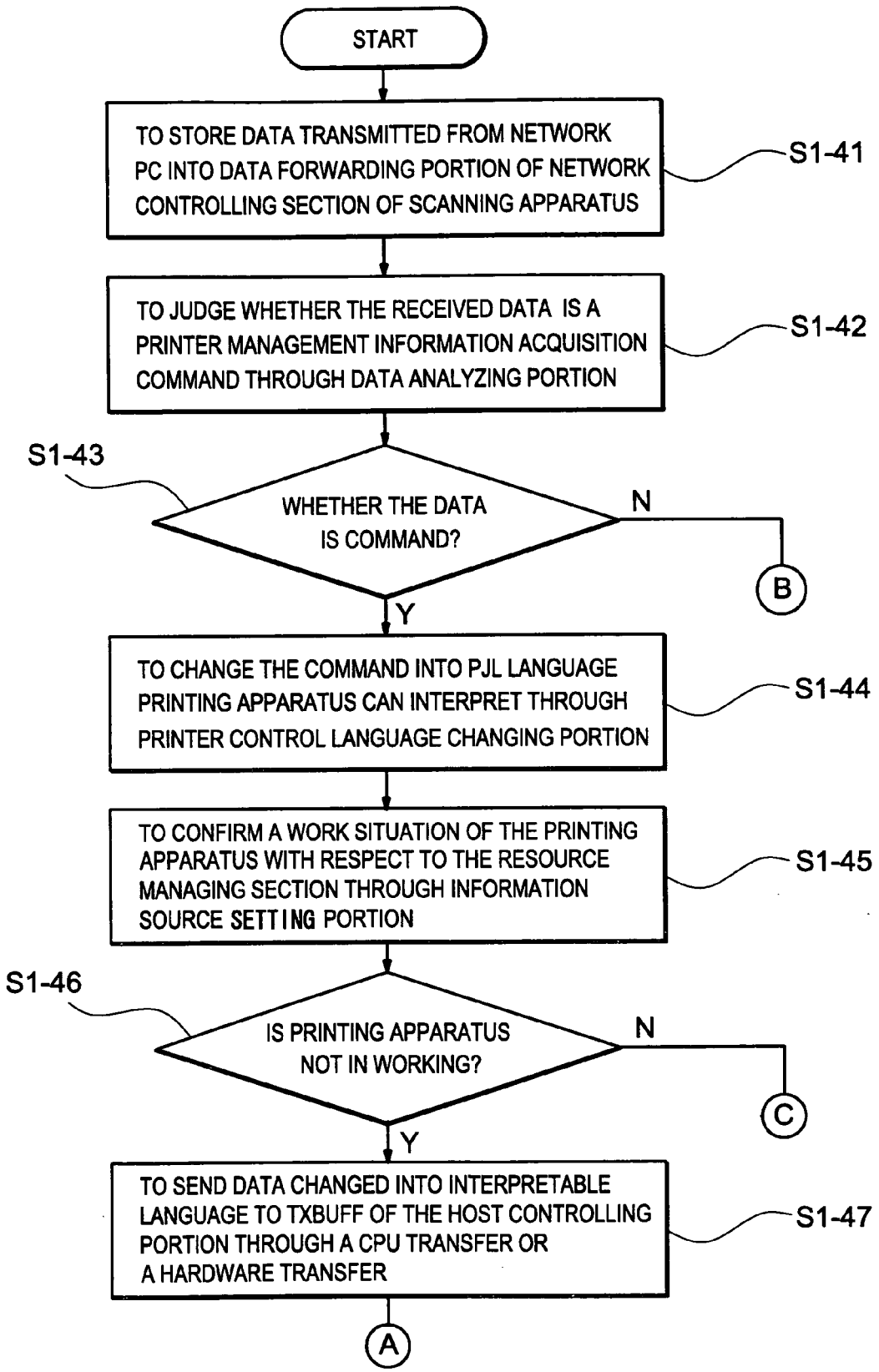
FIG. 13 is a first flowchart showing operations of printer management information acquisition control.
Figure 14:
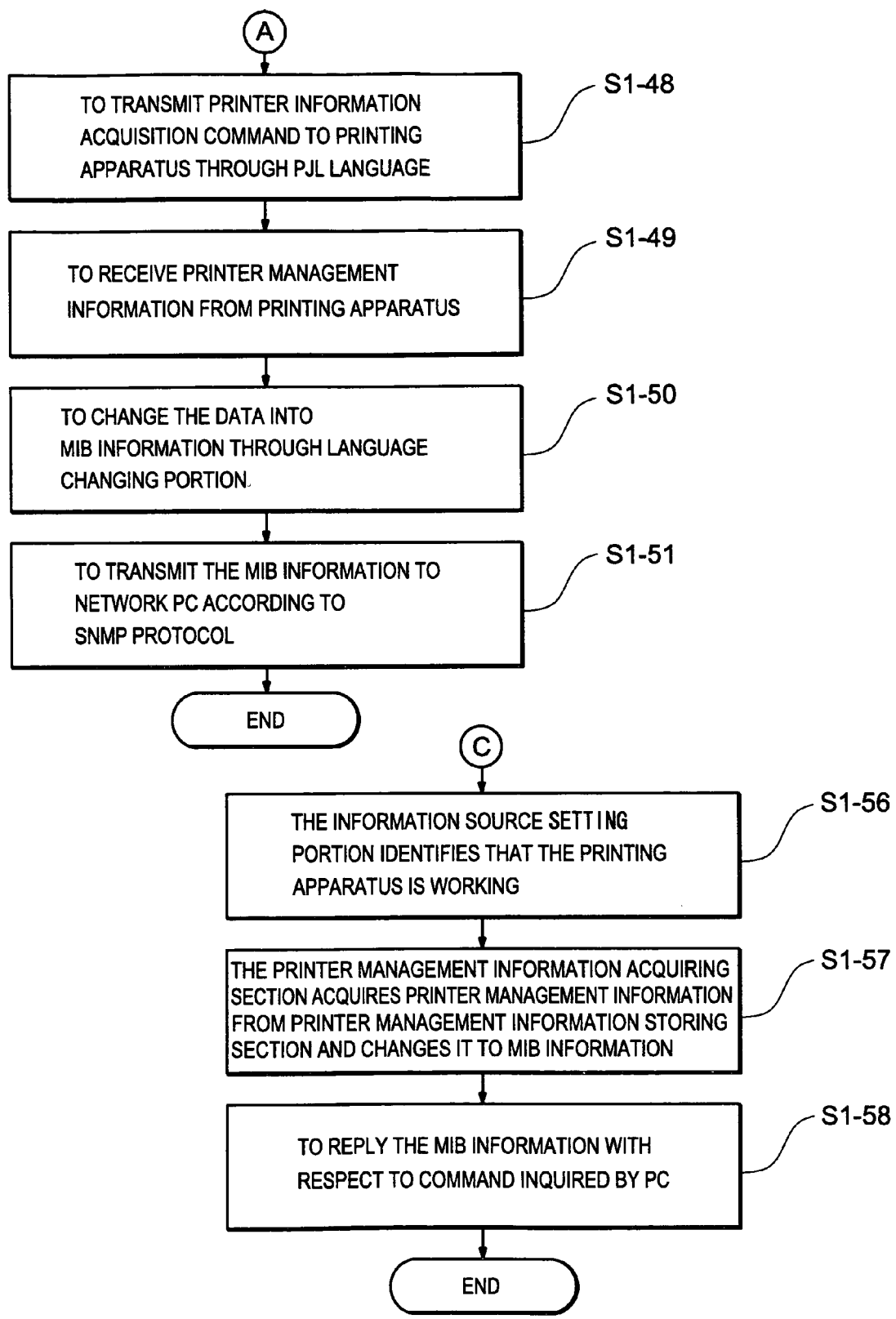
FIG. 14 is a second flowchart showing operations of printer management information acquisition control.
Figure 15:
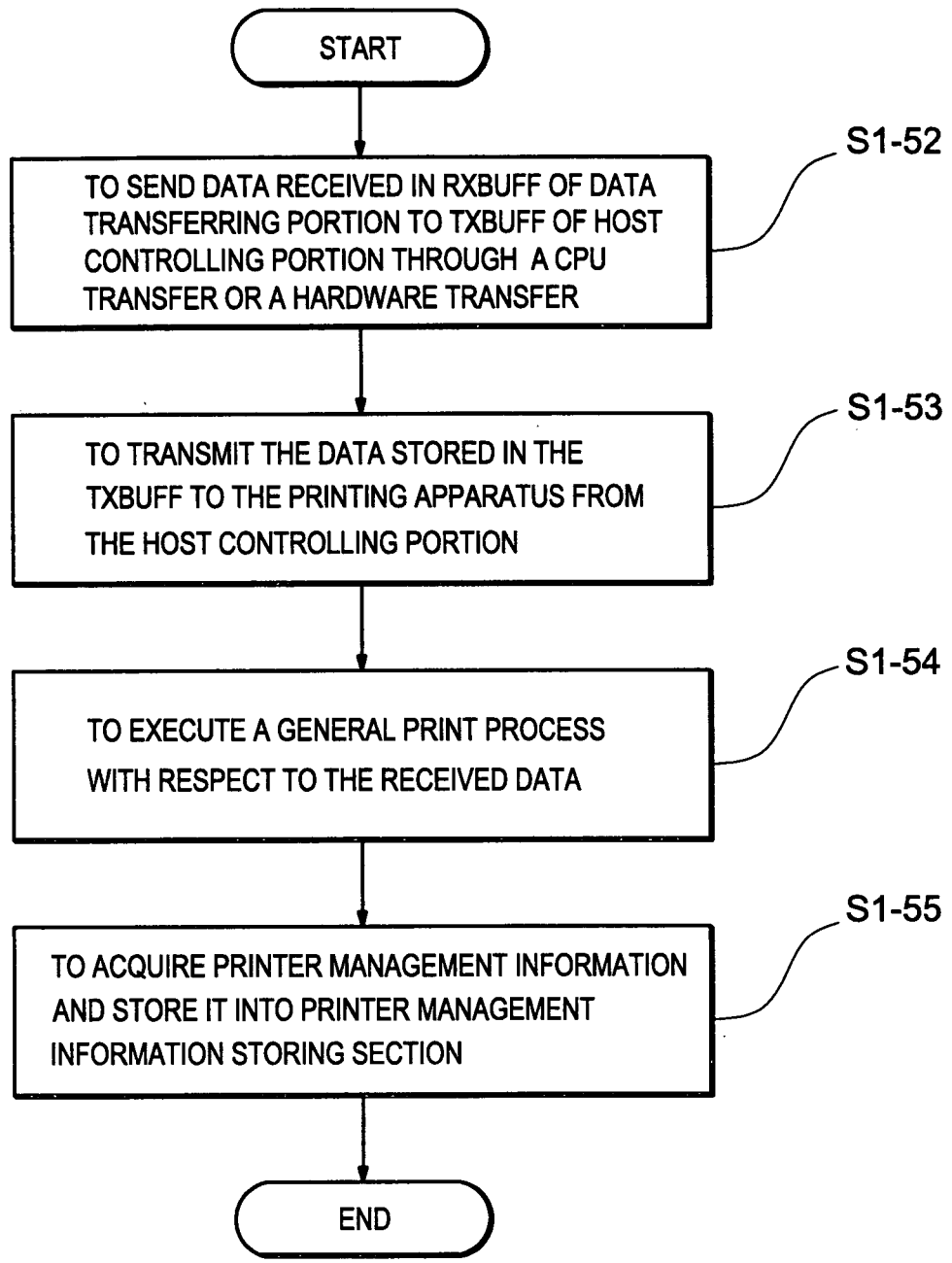
FIG. 15 is a third flowchart showing operations of printer management information acquisition control.

FIG. 13 is a first flowchart showing operations of printer management information acquisition control;

FIG. 14 is a second flowchart showing operations of printer management information acquisition control; and FIG. 15 is a third flowchart showing operations of printer management information acquisition control.

Step S1-41

Data packet transmitted from the network PC 130 (FIG. 12) is stored into RxBuff of the data transferring portion 14-1 (FIG. 12) if the scanning apparatus 100 (FIG. 12).

Step S1-42

The data analyzing portion 14-2 (FIG. 12) judges whether the received data packet is printer management information acquisition command.

Step S1-43

If the received data packet is printer management information acquisition command, Step S1-44 is executed; if the received data packet is print data, Step S1-52 is executed.

Step S1-44

The command is changed into PJL language capable of being interpreted by the printing apparatus 120 (FIG. 12), through the printer control language changing portion 14-3 (FIG. 12).

Step S1-45

The information source setting portion 14-4 (FIG. 12) confirms a work situation of the printing apparatus 120 (FIG. 12) with respect to the resource managing section 12 (FIG. 12).

The resource managing section 12 (FIG. 12) manages a time in which print data is being transmitted to the printing apparatus 120 (FIG. 12) and a predetermined time after the print data comes to an end, and judges that the printing apparatus 120 (FIG. 12) is working while that times.

Step S1-46

In the case that the printing apparatus 120 (FIG. 12) is not working, Step S1-47 is executed; in the case that the printing apparatus 120 (FIG. 12) is working, Step S1-56 is executed.

Step S1-47

The data changed into interpretable language is sent to TxBuff of the host controlling portion 3-2 (FIG. 12) through a Cpu transfer or a hardware transfer.

Step S1-48

The host controlling portion 3-2 (FIG. 12) constructs data packet from the data stored in the TxBuff, and transmits the data packet to the printing apparatus 120 (FIG. 12) Step S1-49

The host controlling portion 3-2 (FIG. 12) receives a response from the printing apparatus 120 (FIG. 12).

Step S1-50

The printer control language changing portion 14-3 (FIG. 12) changes the response (data) into MIB information.

Step S1-51

The data transferring portion 14-1 (FIG. 12) transmits the MIB information to the network PC 130 (FIG. 12) according to SNMP protocol, and ends the flow.

Step S1-52

The data packet received in RxBuff of the data transferring portion 14-1 (FIG. 12) is sent to Txbuff of the host controlling portion 3-2 (FIG. 12) through a Cpu transfer or a hardware transfer.

Step S1-53

The host controlling portion 3-2 (FIG. 12) transmits the data packet stored in the TxBuff to the printing apparatus 120 (FIG. 12) from the host controlling portion 3-2 (FIG. 12).

Step S1-54

The printing apparatus 120 (FIG. 12) obtains print data from the data packet and executes a general print process.

Step S1-55

The scanning apparatus 100 (FIG. 12), after the print process ended, with respect to the printing apparatus 120 (FIG. 12), issues a management information acquisition command of printer language. Here, a judgment of print process end is executed by the scanning apparatus 100 (FIG. 12). When the print data stopped within a predetermined time, the print process can be judged it ended (non-work). The printing apparatus 120 (FIG. 12) having received the management information acquisition command transmits printer management information to the scanning apparatus 100 (FIG. 12). The scanning apparatus 100 (FIG. 12) stores the acquired printer management information into the printer management information storing section 5 (FIG. 2), then ends the flow.

Step S1-56

The information source setting portion 14-4 (FIG. 12) identifies that the printing apparatus 120 (FIG. 12) is working.

Step S1-57

The printer management information acquiring section 4 (FIG. 12) acquires printer management information from the printer management information storing section 5 (FIG. 12).

Step S1-58

The printer control language changing portion 14-3 (FIG. 12) changes the printer management information into network protocol language, the data transferring portion 14-1 (FIG. 12) constructs data packet from the printer management information and transmits the data packet to the network PC 130 (FIG. 12). Then, the flow is ended.

As explained above, in the embodiment, the image processing system comprises a printer management information storing section to store printer management information acquired by a printer management information acquiring section; and a network controlling section which, with respect to a printer management information acquisition request of printing apparatus received from a network PC, according to work situation of the printing apparatus, receives the printer management information from either of the printer management information storing section and the printing apparatus, and return the printer management information to the network PC. Therefore, even if the printing apparatus is working, it is possible to performs a response with respect to the printer management information acquisition request if the printing apparatus 120 received from the network PC.

<Embodiment 2>

In the above-stated embodiment 1, the printer management information which is acquired by the printer management information acquisition means after printing is ended is firstly stored into the printer management information storing section, then is read out from the printer management information storing section so as to reply with respect to the printer management information acquisition request received from the network PC while the printing apparatus is working. However, the judgment of print end is performed by the scanning apparatus, and when the receiving of print data is stopped for a predetermined time, the scanning apparatus judges print is ended. Therefore, in the case that there is a printer management information acquisition request just after printing, the printer management information stored in the printer management information storing section is different from newest data. Because of this, in the embodiment, a JOB end command is contained in USB data packet sent by host apparatus, then the scanning apparatus performs a print end judgment.

Figure 16:
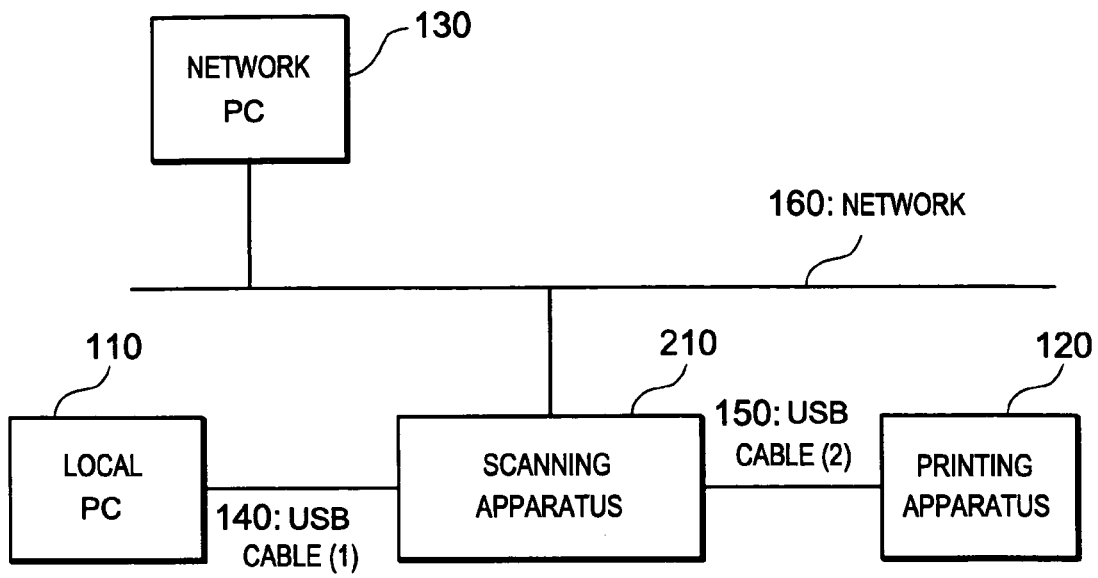
FIG. 16 is a block diagram showing whole structure of an image system in embodiment 2.

FIG. 16 is a block diagram showing whole structure of an image system in embodiment 2.

As shown by FIG. 16, an image processing system comprises a local PC 200, a scanning apparatus 210 (i.e. scanner), a printing apparatus 120 (i.e. printer), a network PC 130, a USB cable (1) 140, a USB cable (2) 150 and a network 160. The following is to only explain the different part from the embodiment 1, regarding the same part, it will be given the same reference sign, and its explanation will be omitted.

Figure 17:
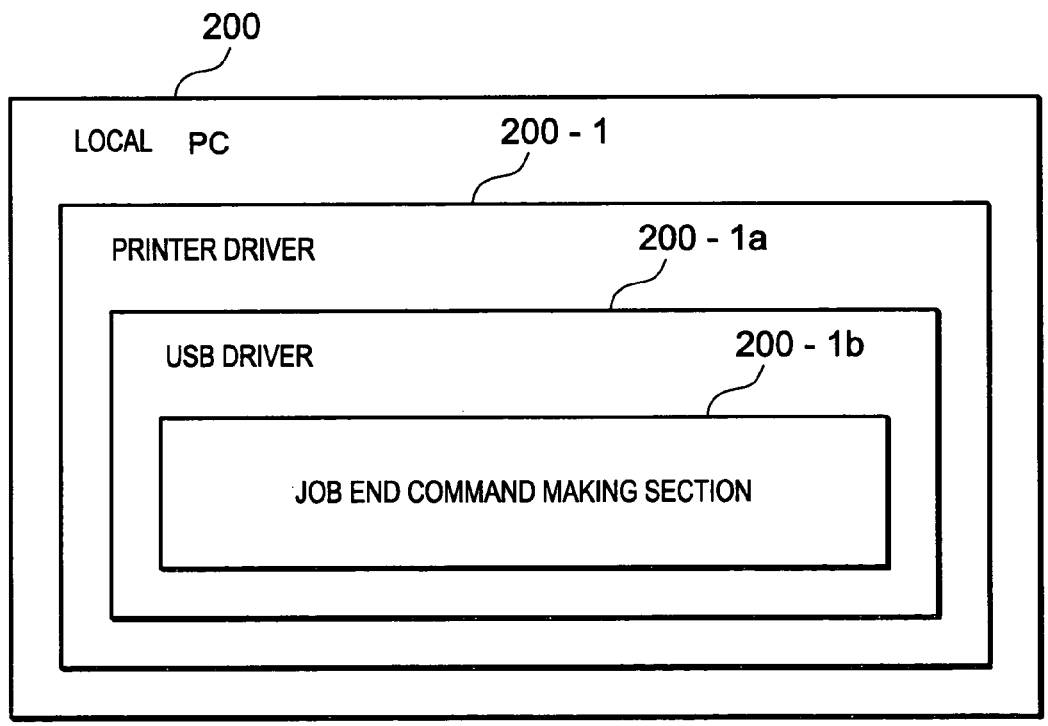
FIG. 17 is an explanation diagram of a local PC addition structure in embodiment 2.

FIG. 17 is an explanation diagram of a local PC addition structure in embodiment 2.

As shown by FIG. 2, in the local PC 200 as a general PC (Personal Computer), a USB driver 200-1*a* is installed, in inside of the USB driver 200-1*a*, a JOB end command making section 200-1*b* is provided. The JOB end command making section 200-1*b* is a part to make a JOB end command for informing the scanning apparatus 210 (FIG. 17) of an end of print job.

The command is made as a vendor command of control of USB protocol. Through the JOB end command making section 200-1*b*, while PC print in the embodiment 2, at the end of print JOB, a JOB end command serving as vendor definition command is appended. That is, the command is realized by previously performs a definition to a vendor request of control transfer of USB protocol. The JOB end command making section 200-1*b*, when a print job of PC print in the embodiment 2 ended, generates the command (vendor request) and sends it, then an end of print job is informed.

Figure 18:
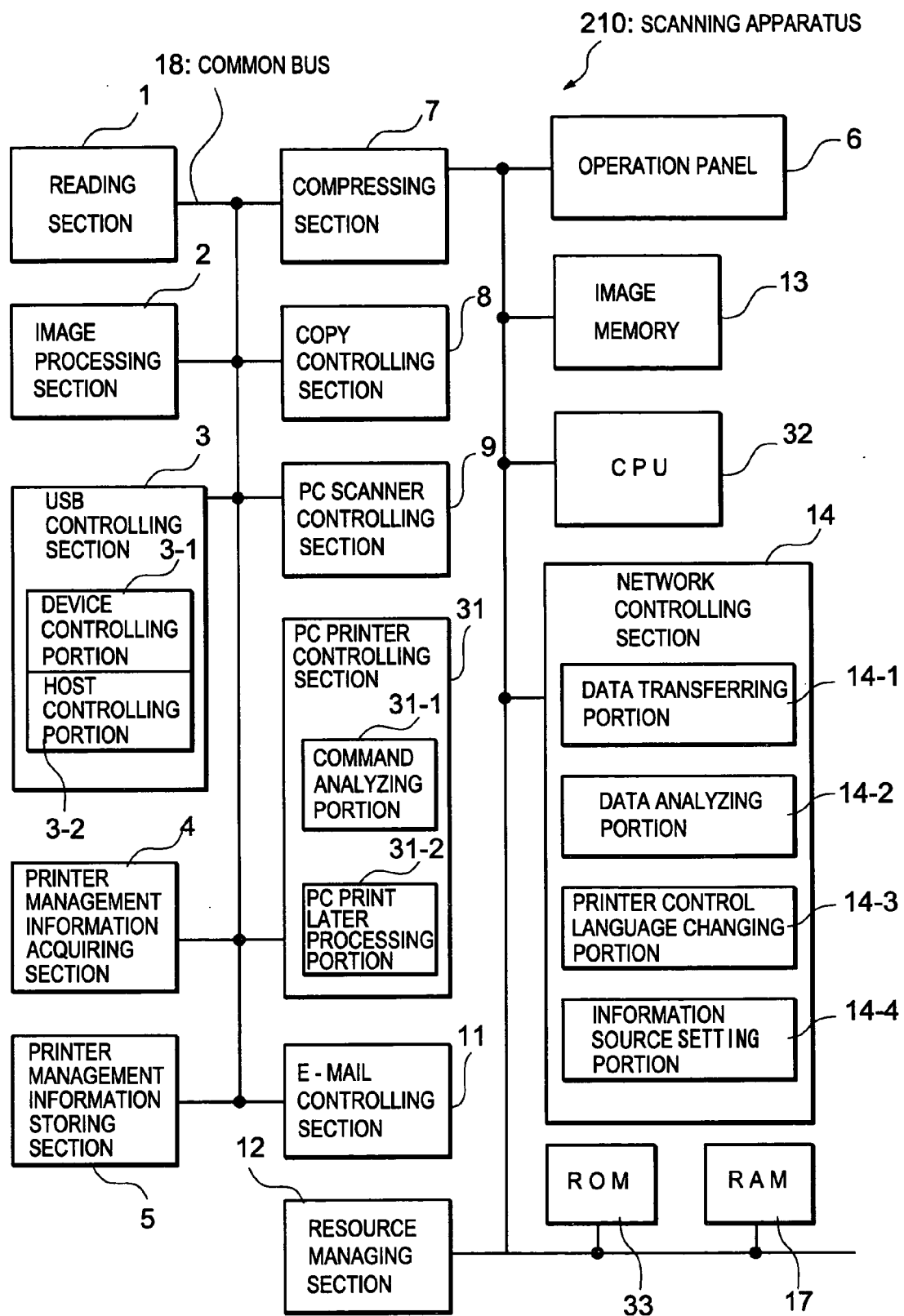
FIG. 18 is a block diagram showing internal structure of a scanning apparatus in embodiment 2.

FIG. 18 is a block diagram showing internal structure of a scanning apparatus in embodiment 2.

As shown by FIG. 18, the scanning apparatus 210 includes a reading section 1, an image processing section 2, a USB controlling section 3, a printer management information acquiring section 4, a printer management information storing section 5, an operation panel 6, a compressing section 7, a copy controlling section 8, a PC scanner controlling section 9, a PC printer controlling section 31, an E-mail controlling section 11, a resource managing section 12, an image memory 13, a network controlling section 14, a CPU 32, a ROM 33, a RAM 17 and a common bus 18. The following is to only explain the different part from the embodiment 1, regarding the same part, it will be given the same reference sign, and its explanation will be omitted.

The PC printer controlling section 31 in the scanning apparatus 210 is a part, once received the data packet from PC, to transfer data packet to the printing apparatus 120; and has a command analyzing portion 31-1 and a PC print later processing portion 31-2.

The command analyzing portion 31-1 is a means to abstract the JOB end command from various kinds of commands sent from the local PC 200 (FIG. 16). Then in order to make printer management information acquiring section 4 to acquire printer management information, the PC print later processing portion 31-2 is a means to communicate a series of command/response and the like, when the command analyzing portion 31-1 detected the JOB end command.

The CPU 32 is a micro-processor to execute a control program previously stored in the ROM 33 so as to start or control the all compositions stated above. In the part of starting and controlling of the embodiment, the command analyzing portion 31-1 and the PC print later processing portion 31-2 are added. The ROM 33 is a read only memory to previously store a control program to be executed by the CPU 32 for starting or controlling the all compositions stated above. In the embodiment, a control program to start and control the command analyzing portion 31-1 and the PC print later processing portion 31-2 is added.

Figure 19:
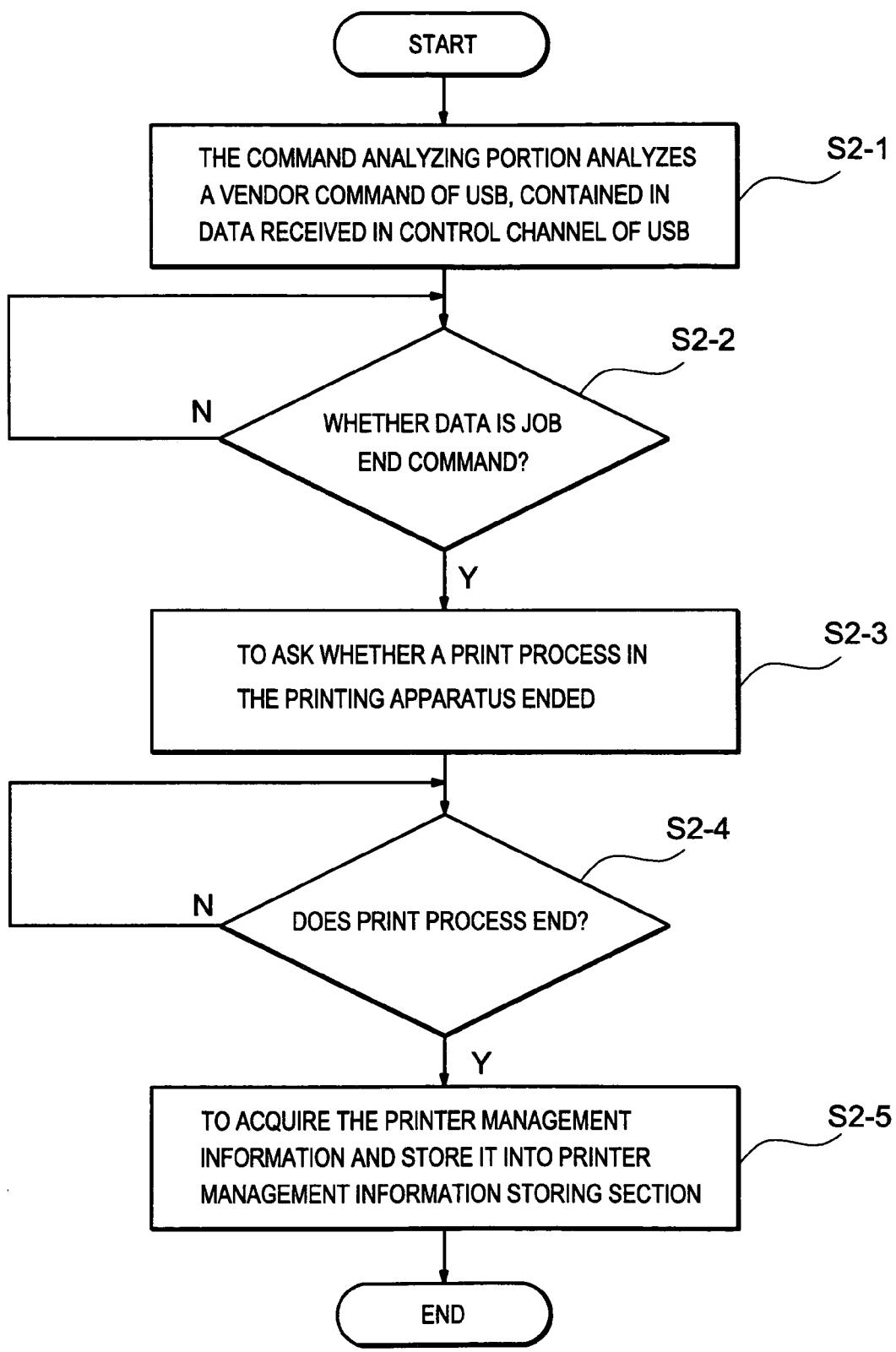
FIG. 19 is a flowchart showing operations while PC print is ending in embodiment 2.

Next is to explain operations different from that in embodiment 1 as follows:

FIG. 19 is a flowchart showing operations while PC print is ending in embodiment 2.

The FIG. 19 showed processing contents in the case that the local PC 200 (FIG. 16) uses the printing apparatus 120 (FIG. 16) to execute a PC print on the basis of USB control, and as stated by FIG. 17, the JOB end command is sent at the end of print JOB.

Step S2-1

The command analyzing portion 31-1 (FIG. 18) analyzes a vendor command contained in data packet received on the basis of USB control.

Step S2-2

A detection to detect a JOB end command is waited, and when the detection is performed, a next step is executed.

Step S2-3

PC print later processing portion 31-2 uses PJL to ask whether a print process in the printing apparatus 120 ended via the host controlling portion 3-2 (FIG. 18).

Step S2-4

When a response of print process end is received with respect to the asking through PJL, a next step is executed.

Step S2-5

The printer management information acquiring section 4 (FIG. 18) uses the PJL to acquire the printer management information from the printing apparatus 120 (FIG. 18), and stores the printer management information into the printer management information storing section 5 (FIG. 18), then ends the flow. Moreover, the resource managing section 12 (FIG. 18) manages a situation in a period from starting to send print data to the printing apparatus 120 (FIG. 16) to that the PC print later processing portion 31-2 (FIG. 18) received a response of print process end from the printing apparatus 120 (FIG. 18), as printer work situation As stated above, after received the JOB end command in the data packet sent from a host apparatus, through a PJL command and a its response, the scanning apparatus executes a print end judgment. Therefore, it is possible to obtain a newest printer management information from the printer management information storing section in inside of the scanning apparatus. Because of this, an effect can be obtained to always provide newest printer management information with respect to the acquisition request of the printer management information from the network PC.

In the explanation, only the case that a JOB end command is contained in the local PC is explained, but the present invention does not limit the case. That is, the present invention is also capable of simply changing controlling program to make the JPB end command be contained in the network PC.

<Embodiment 3>

In the above-stated embodiment 2, after received the JOB end command in the data packet sent from a host apparatus, through a PJL command and a its response, the scanning apparatus executes a print end judgment. In the embodiment 3, the scanning apparatus monitors a network connection, inquires the printing apparatus when the network connection is broken, then receives a response of print process end and performs a judgment.

Figure 20:
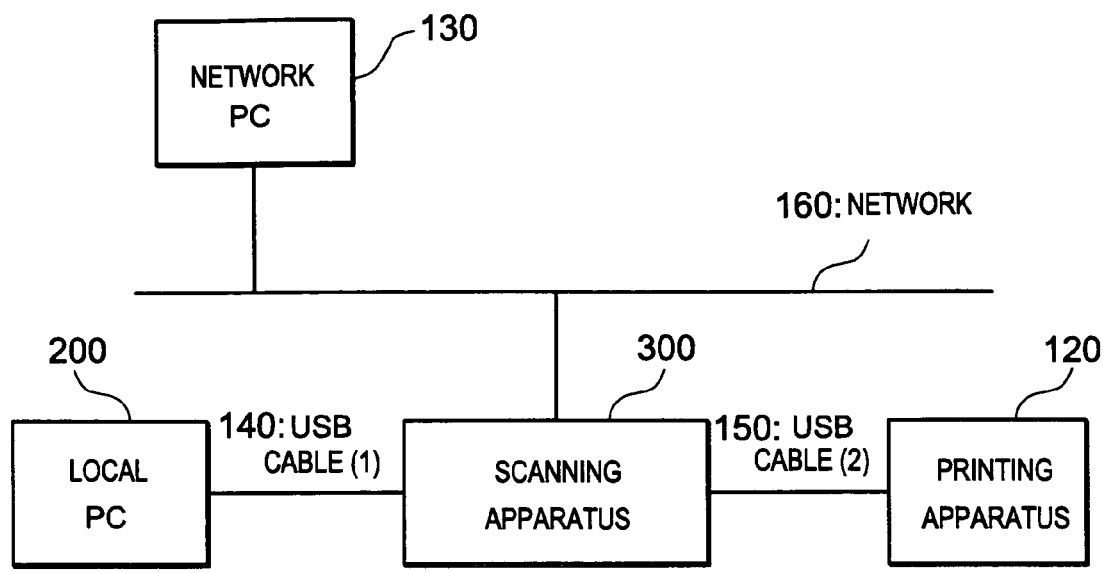
FIG. 20 is a block diagram showing whole structure of an image system in embodiment 3.

FIG. 20 is a block diagram showing whole structure of an image system in embodiment 3.

As shown by the FIG. 20, an image processing system comprises a local PC 200, a scanning apparatus 300 (i.e. scanner), a printing apparatus 120 (i.e. printer), a network PC 130, a USB cable (1) 140, a USB cable (2) 150 and a network 160. The following is to only explain the different part from the embodiment 2, regarding the same part, it will be given the same reference sign, and its explanation will be omitted.

Figure 21:
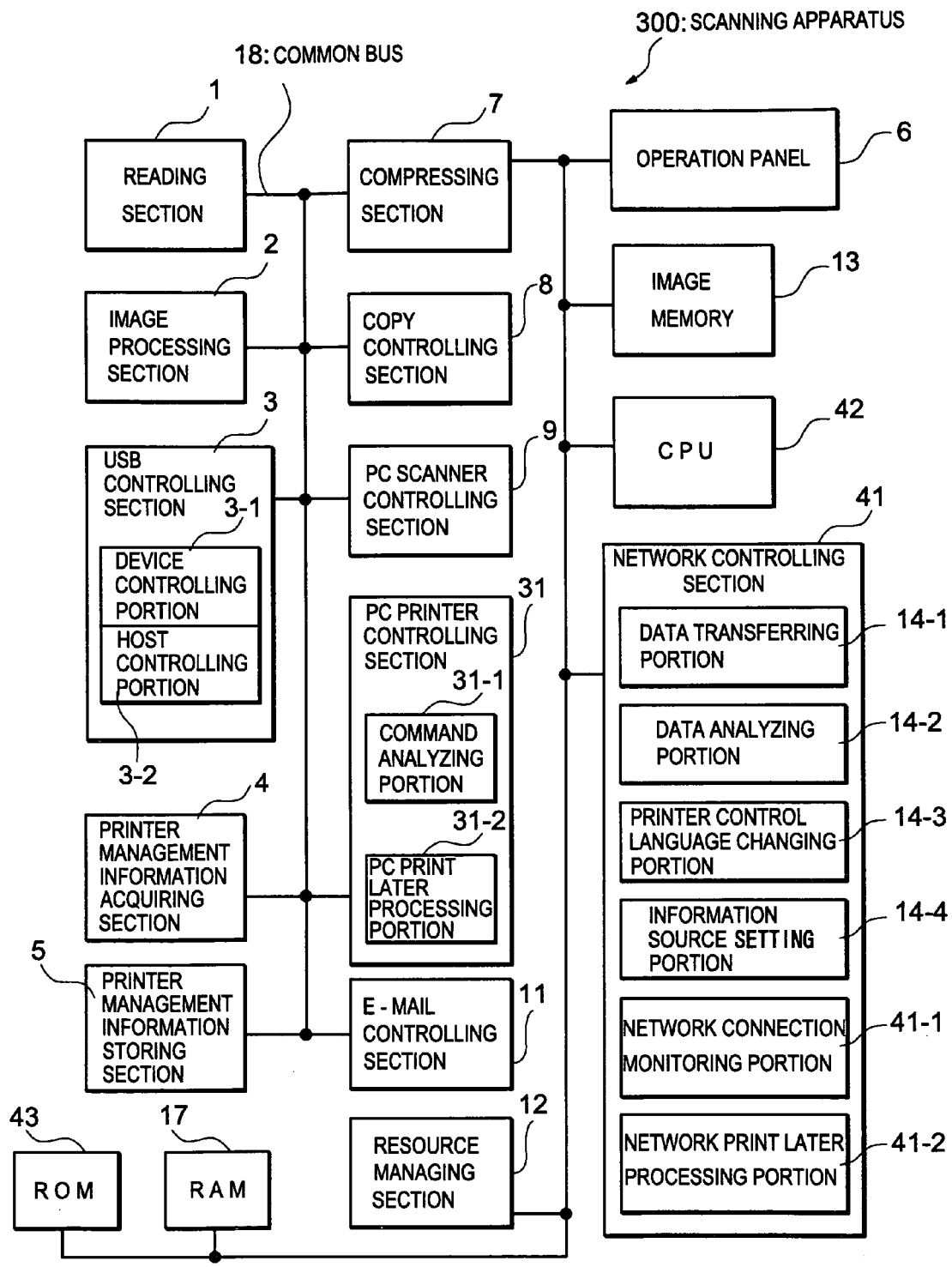
FIG. 21 is a block diagram showing internal structure of a scanning apparatus in embodiment 3.

FIG. 21 is a block diagram showing internal structure of a scanning apparatus in embodiment 3.

As shown by FIG. 21, the scanning apparatus 300 includes a reading section 1, an image processing section 2, a USB controlling section 3, a printer management information acquiring section 4, a printer management information storing section 5, an operation panel 6, a compressing section 7, a copy controlling section 8, a PC scanner controlling section 9, a PC printer controlling section 31, an E-mail controlling section 11, a resource managing section 12, an image memory 13, a network controlling section 41, a CPU 42, a ROM 43, a RAM 17 and a common bus 18. The following is to only explain the different part from the embodiment 2, regarding the same part, it will be given the same reference sign, and its explanation will be omitted.

The network controlling section 41 has a data transferring portion 14-1, a data analyzing portion 14-2, a printer control language changing portion 14-3, an information source setting portion 14-4, a network connection monitoring portion 41-1 and a network print later processing portion 41-2; and it is a part to make the scanning apparatus 300 connect with the network 160.

The data transferring portion 14-1 is a means to execute reception and transmission of data packet between the network 160 (FIG. 20) and the scanning apparatus 300 (FIG. 20). The data analyzing portion 14-2 is a means to analyze data packet received by the data transferring portion 14-1. The printer control language changing portion 14-3 is a means to change the data packet received by the data transferring portion 14-1 into language which is capable of being understood by the printing apparatus 120 without network function, in the case that the data packet is a control signal (except image data) according to network protocol.

The network connection monitoring portion 41-1 is a means to monitor communication via the network 160 between the network PC 130 (FIG. 20) and the scanning apparatus 300 (FIG. 20), and to detect a break of network connection. Then, in order to make printer management information acquiring section 4 to acquire printer management information, the network print later processing portion 41-2 is a means to communicate a series of command/response and the like, when the network connection monitoring portion 41-1 detected the break of network connection.

The CPU 42 is a micro-processor to execute a control program previously stored in the ROM 43 so as to start or control the all compositions stated above. In the part of starting and controlling of the embodiment, the network connection monitoring portion 41-1 and the network print later processing portion 41-2 are added. The ROM 43 is a read only memory to previously store a control program to be executed by the CPU 42 for starting or controlling the all compositions stated above. In the embodiment, a control program to start and control the network connection monitoring portion 41-1 and the network print later processing portion 41-2 is added.

Figure 22:
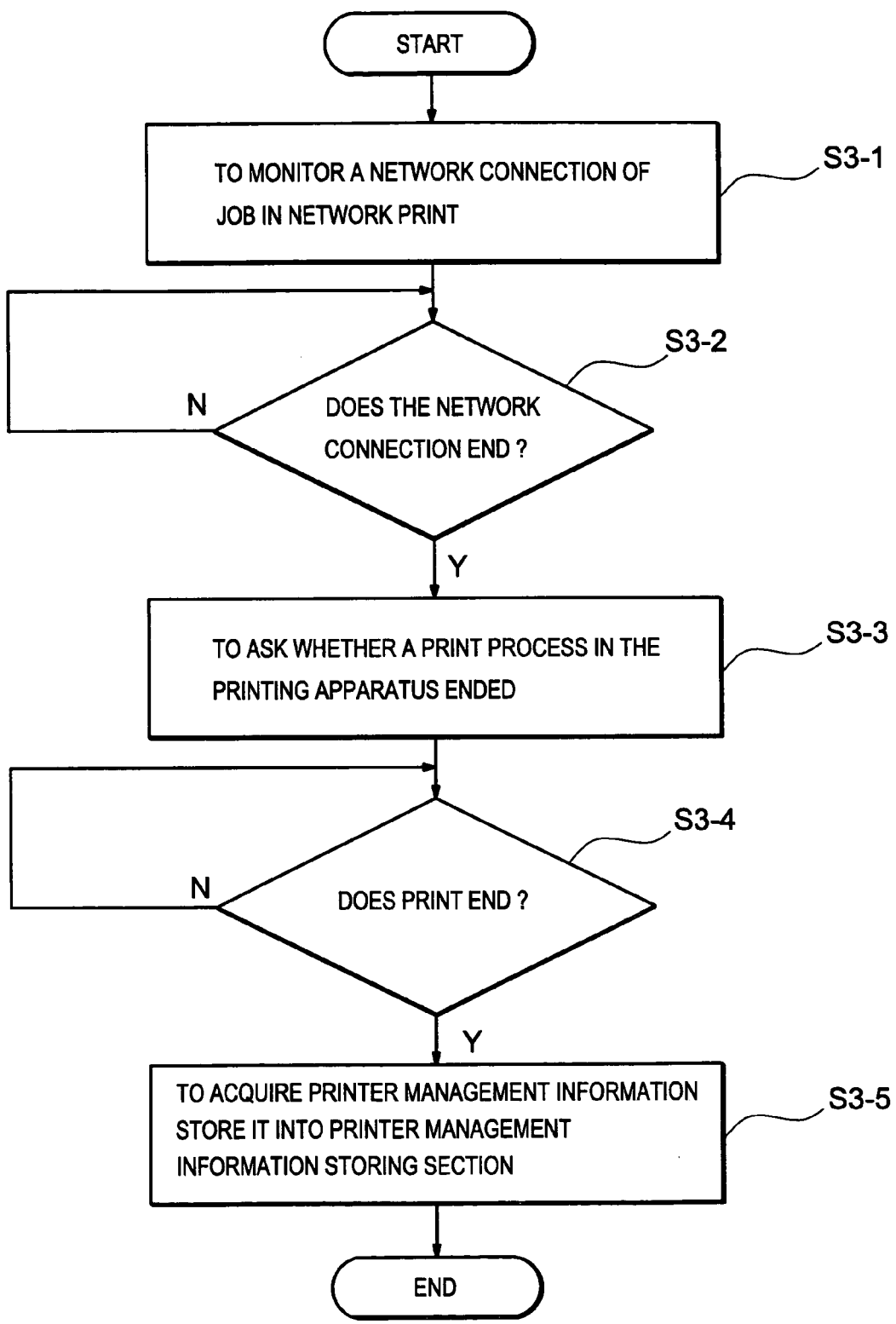
FIG. 22 is a flowchart showing operations while network print is ending in embodiment 3.

Next is to explain operations different from that in embodiment 2 as follows:

FIG. 22 is a flowchart showing operations while network print is ending in embodiment 3.

The FIG. 22 showed processing contents in the case that the network PC 130 (FIG. 20) uses the printing apparatus 120 (FIG. 20) to execute a PC print on the basis of USB control, and network connection is broken while a print is ending.

Step S3-1

The network connection monitoring portion 41-1 (FIG. 21) monitors a network connection. The monitoring operation is performed by monitoring a negotiation signal sent from the network PC 130 (FIG. 20).

Step S3-2

The network connection monitoring portion 41-1 (FIG. 21) stands by until the network connection is broken. When it is broken (the negotiation signal can not be received), next step is executed.

Moreover, a print function between the network PC 130 (FIG. 20) and the scanning apparatus 300 (FIG. 20) is realized by communication protocol called TCP/IP print. In the TCP/IP print, when a series of print ended, a negotiation is performed by sending each other a packet signal of connection break request called FIN packet. Therefore, through detecting the FIN packet, it is possible to detect a break of the connection of the network printer.

Step S3-3

The network print later processing portion 41-2 (FIG. 21) uses PJL command to ask whether a print process in the printing apparatus 120 (FIG. 20) ended via the host controlling portion 3-2 (FIG. 21).

Step S3-4

When a response of print process end is received with respect to the asking through PJL, a next step is executed.

Step S3-5

The printer management information acquiring section 4 (FIG. 21) uses the PJL to acquire the printer management information from the printing apparatus 120 (FIG. 20), and stores/updates the printer management information into the printer management information storing section 5 (FIG. 21), then ends the flow. Moreover, the resource managing section 12 manages a situation in a period from starting to send print data to the printing apparatus 120 to that the network print later processing portion 41-2 received a response of print process end from the printing apparatus 120 (FIG. 18), as work situation of the printing apparatus 120.

As stated above, after detected a break of the network connection, through the PJL command and a its response, the scanning apparatus executes a print end judgment. Therefore, it is possible to obtain a newest printer management information from the printer management information storing section in inside of the scanning apparatus. Because of this, an effect can be obtained to always provide newest printer management information with respect to the acquisition request of the printer management information from the network PC.

In the explanation, only the case that a print end is detected through a break of network connection between the network PC and the scanning apparatus is explained, but the present invention does not limit the case. That is, the present invention is also capable of simply changing controlling program to detect a cancellation of USB configuration between the local PC and the scanning apparatus.

The present invention is not limited to the foregoing embodiments but many modifications and variations are possible within the spirit and scope of the appended claims of the invention.

Moreover, the present invention can be applied to a fee-charging system of network printing apparatus.

Further, in the above embodiments, with connecting the scanning apparatus to the network, the printing apparatus if connected to the scanning apparatus, and the network PC printer management information of the printing apparatus. It can be considered to connect the printing apparatus to the network, and connect the scanning apparatus to the printing apparatus.

In the case, the printing apparatus previously store management information of the scanning apparatus, once received a request to acquire the management information of the scanning apparatus from the network PC, according to the work situation of the scanning apparatus, sends to the network PC either of management information stored in its own side and management information acquired from the scanning apparatus.

Then, the management information of the scanning apparatus in the case may be various setting information, option installation information of ADF and the like, ID information of apparatus, life information of apparatus and the like.

What is claimed is:

1. An image processing apparatus, comprising:
a network connecting section to connect with a network;
an interface section to connect with a printing apparatus;
a management information acquiring section to acquire management information of said printing apparatus, said management information including at least one of information about the printing apparatus and information about consumables used by the printing apparatus;
a management information storing section to store the management information of said printing apparatus, acquired by said management information acquiring section; and
a network controlling section that comprises:
    a data transferring section to transfer data to said printing apparatus via said interface section; and
    a situation acquiring section to acquire situation information about whether or not said printing apparatus is printing;
wherein when the network controlling section receives an acquisition request for the management information of said printing apparatus from a host apparatus on said network, the network controlling section performs:
    determining whether or not said printing apparatus is printing according to said situation information, and
    obtaining said management information from said printing apparatus if said printing apparatus is not printing,
    obtaining said management information from said management information storing section if said printing apparatus is printing, and
    sending said obtained management information to said host apparatus.

2. The image processing apparatus according to claim 1, further comprising:
a resource managing section to manage a work situation of said printing apparatus;
wherein said network controlling section acquires the work situation of said printing apparatus from said resource managing section, and when said printing apparatus is printing, sets said management information storing section into a reading source of the management information of said printing apparatus, and when said printing apparatus is not printing, sets said printing apparatus into said reading source of the management information.

3. The image processing apparatus according to claim 1, wherein said management information acquiring section updates the management information in said management information storing section when said printing apparatus completes a printing job.

4. The image processing apparatus according to claim 3, wherein the completion of the printing job is determined on the basis of a stop time of data transfer through said data transferring section.

5. The image processing apparatus according to claim 3, wherein the completion of the printing job is determined on the basis of a predetermined command received from said host apparatus.

6. The image processing apparatus according to claim 3, wherein the completion of the printing job is determined on the basis of a network disconnection signal of said host apparatus.

7. The image processing apparatus according to claim 3, wherein said data transferring section transfers print data received from said host apparatus to said printing apparatus, and
wherein the completion of the printing job is determined on the basis of a stop time of the print data transfer through said data transferring section.

8. The image processing apparatus according to claim 3, wherein said data transferring section transfers print data received from said host apparatus to said printing apparatus, and
wherein the completion of the printing job is determined on the basis of a predetermined command received from said host apparatus.

9. The image processing apparatus according to claim 3, wherein said data transferring section transfers print data received from said host apparatus to said printing apparatus, and
wherein the completion of the printing job is determined on the basis of a network disconnection signal of said host apparatus.

10. The image processing apparatus according to claim 3, further comprising: an image reading section to read a manuscript, wherein said data transferring section transfers image data read by said image reading section to said printing apparatus.

11. The image processing apparatus according to claim 1, wherein said management information of said printing apparatus is returned to said host apparatus.

12. The image processing apparatus according to claim 1, wherein the acquisition of the management information of said printing apparatus by said host apparatus is executed by using SNMP protocol.

13. The image processing apparatus according to claim 12, wherein said network controlling section has a command changing portion to change a management information acquisition request through said SNMP protocol into a control command capable of being interpreted by said printing apparatus.

14. The image processing apparatus of claim 1, wherein the management information of the printing apparatus includes both information about the printing apparatus and information about consumables used by the printing apparatus.

15. The image processing apparatus of claim 14, wherein the management information of the printing apparatus includes information selected from the group that includes option information about the printing apparatus, expendable information about image drum life, sheet information about one or more sheet trays of the printing apparatus, print sheets information, print setting information about size settings of the one or more sheet trays, printing apparatus situation information about availability of the printing apparatus, and printing apparatus information about the printing apparatus.

16. An image reading apparatus for use with a network computer, a network that connects the image reading apparatus to the network computer, a printing apparatus, and a USB cable that connects the image reading apparatus to the printing apparatus, said image reading apparatus comprising:

a printer management information acquiring section to acquire management information of the printing apparatus, the management information of the printing apparatus including at least one of information about the printing apparatus and information about consumables used by the printing apparatus;

a management information storing section to store the management information of the printing apparatus, acquired by the management information acquiring section; and a network controlling section which receives an acquisition request for the management information of the printing apparatus from the network computer and then performs:

determining whether the printing apparatus is busy, obtaining the management information from the printing apparatus if the printing apparatus is not busy, obtaining the management information from the management information storing section if the printing apparatus is busy, and sending the obtained management information to the network computer.

17. The image reading apparatus according to claim 16, further comprising:

a resource managing section to manage the work situation of the printing apparatus; wherein the network controlling section acquires situation information about the printing apparatus from the resource managing section, and when printing apparatus is busy, sets the management information storing section as a reading source of the management information, and when the printing apparatus is not busy, sets the printing apparatus as the reading source of the management information.

18. The image reading apparatus according to claim 16, wherein the printer management information acquiring section updates the management information in the management information storing section when the printing apparatus completes a printing job.

19. The image reading apparatus according to claim 16, further comprising:

an image reading section to read a document, wherein image data read by the image reading section is transferred to the printing apparatus.

* * * * *